(12) United States Patent
Kwak et al.

(10) Patent No.: US 11,575,480 B2
(45) Date of Patent: Feb. 7, 2023

(54) METHOD AND DEVICE FOR TRANSMITTING DATA IN MOBILE COMMUNICATION SYSTEM

(71) Applicant: Samsung Electronics Co., Ltd., Gyeonggi-do (KR)

(72) Inventors: Youngwoo Kwak, Gyeonggi-do (KR); Hoondong Noh, Gyeonggi-do (KR); Cheolkyu Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 192 days.

(21) Appl. No.: 16/622,602

(22) PCT Filed: May 31, 2018

(86) PCT No.: PCT/KR2018/006193
§ 371 (c)(1),
(2) Date: Dec. 13, 2019

(87) PCT Pub. No.: WO2018/230869
PCT Pub. Date: Dec. 20, 2018

(65) Prior Publication Data
US 2021/0152302 A1 May 20, 2021

(30) Foreign Application Priority Data

Jun. 15, 2017 (KR) .................. 10-2017-0076064

(51) Int. Cl.
*H04L 5/00* (2006.01)
(52) U.S. Cl.
CPC .......... *H04L 5/0048* (2013.01); *H04L 5/0057* (2013.01)
(58) Field of Classification Search
CPC ... H04L 5/0048; H04L 5/0057; H04W 72/042
(Continued)

(56) References Cited

U.S. PATENT DOCUMENTS

2015/0200754 A1  7/2015  Sayana et al.
2015/0215018 A1*  7/2015  Xiong .................. H04B 7/0486
                                                   370/329
(Continued)

FOREIGN PATENT DOCUMENTS

KR      1020150030197      3/2015
KR      1020180022516      3/2018
WO     WO 2017/026794      2/2017

OTHER PUBLICATIONS

PCT/ISA/210 Search Report issued on PCT/KR2018/006193, pp. 5.
PCT/ISA/237 Written Opinion issued on PCT/KR2018/006193, pp. 6.
Samsung, 3GPP TSG RAN WG1#89, R1-1707979, Hangzhou, China, May 6, 2017, "On QCL for NR", pp. 8.

(Continued)

*Primary Examiner* — Chi Tang P Cheng
(74) *Attorney, Agent, or Firm* — The Farrell Law Firm, P.C.

(57) ABSTRACT

The present disclosure relates to a communication technique for convergence of a 5G communication system for supporting a higher data transmission rate beyond a 4G system with an IoT technology, and a system therefor. The present disclosure may be applied to an intelligent service (for example, smart home, smart building, smart city, smart car or connected car, health care, digital education, retail business, security and safety-related service, etc.) on the basis of a 5G communication technology and an IoT-related technology. The present invention relates to a method of a wireless communication system, the method comprising the steps of: receiving at least one piece of quasi co-location (QCL) configuration information including information indicating a plurality of CSI-RS resources from a base station; receiving downlink control information (DCI) including an indicator indicating one of the at least one piece of QCL configuration information; estimating channel state information on the basis of at least one CSI-RS resource among the plurality of CSI-RS resources; and receiving downlink data on the basis of the channel state information, (Continued)

wherein the plurality of CSI-RS resources include at least one among a periodic CSI-RS resource, a semi-persistent CSI-RS resource, and an aperiodic CSI-RS resource.

17 Claims, 19 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0349940 A1* | 12/2015 | Kim ........................ | H04L 5/005 370/329 |
| 2016/0227548 A1* | 8/2016 | Nimbalker ............ | H04L 5/0048 |
| 2017/0005764 A1* | 1/2017 | Park ........................ | H04L 5/006 |
| 2018/0102817 A1* | 4/2018 | Park ........................ | H04B 7/04 |
| 2018/0115357 A1* | 4/2018 | Park ........................ | H04B 7/06 |
| 2018/0212800 A1 | 7/2018 | Park et al. | |
| 2019/0116594 A1* | 4/2019 | Kwak .................... | H04L 5/0044 |
| 2019/0190673 A1 | 6/2019 | Kwak et al. | |
| 2019/0349065 A1* | 11/2019 | Zhang .................... | H04B 7/088 |
| 2019/0349915 A1* | 11/2019 | Ahn ....................... | H04L 5/0091 |
| 2019/0373614 A1* | 12/2019 | Yum ...................... | H04B 17/336 |
| 2020/0314854 A1* | 10/2020 | Chen ................. | H04W 72/0446 |
| 2020/0383060 A1* | 12/2020 | Park ...................... | H04W 24/08 |
| 2020/0389220 A1* | 12/2020 | Kang ................ | H04W 74/0833 |

OTHER PUBLICATIONS

LG Electronics, 3GPP TSG RAN WG1 Meeting #89, R1-1707613, Hangzhou, P.R. China, May 6, 2017, "On CSI-RS design for CSI acquisition", pp. 7.
Samsung, 3GPP TSG RAN WG1 89, R1-1707963, Hangzhou, China, May 5, 2017, "Discussion on CSI-RS Resource Allocation", pp. 7.
LG Electronics, Intel Corporation, OPPO, Qualcomm, Xinwei, ZTE, 3GPP TSG RAN1 #89, R1-1709377, Hangzhou, P.R. China, May 17, 2017, . . . "WF on QCL for CSI-RS as beam-related indication", pp. 6.
InterDigital Communications, "On CSI-RS Design for NR", R1-1700714, 3GPP TSG RAN WG1 AH_NR Meeting, Jan. 16-20, 2017, 3 pages.
Samsung, Huawei, HiSilicon, Remaining Issues on NR CSI-RS, R1-1707981, 3GPP TSG RAN WG1 Meeting #89, May 15-19, 2017, 15 pages.
Korean Office Action dated Aug. 3, 2021 issued in counterpart application No. 10-2017-0076064, 8 pages.
Qualcomm, "Potential Agreements on Beam Management", R1-1709774, 3GPP TSG RAN1 #89, May 15-19, 2017, 16 pages.
Nokia, "Summary of QCL", R1-1709298, 3GPP TSG RAN WG1#89, May 15-19, 2017, 10 pages.
Korean Office Action dated Feb. 15, 2022 issued in counterpart application No. 10-2017-0076064, 9 pages.
Korean Office Action dated Sep. 16, 2022 issued in counterpart application No. 10-2017-0076064, 7 pages.

* cited by examiner

METHOD AND DEVICE FOR TRANSMITTING DATA IN MOBILE COMMUNICATION SYSTEM

PRIORITY

This application is a National Phase Entry of PCT International Application No. PCT/KR2018/006193 which was filed on May 31, 2018, and claims priority to Korean Patent Application No. 10-2017-0076064, which was filed on Jun. 15, 2017, the content of each of which is incorporated herein by reference.

TECHNICAL FIELD

The disclosure relates to a wireless communication system and more particularly to a method of indicating quasi-co-location (QCL) information indicated when a base station transmits data to a terminal.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, full dimensional MIMO (FD-MIMO), array antenna, analog beam-forming, and large scale antenna are being discussed as means to mitigate a propagation path loss in the mmWave band and increase a propagation transmission distance. Further, the 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation to improve the system network. In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA).

Meanwhile, the Internet has been evolved to an Internet of things (IoT) network in which distributed components such as objects exchange and process information from a human-oriented connection network in which humans generate and consume information. An Internet of everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information technology (IT) and various industries.

Accordingly, various attempts to apply the 5G communication to the IoT network are made. For example, technologies such as a sensor network, machine-to-machine (M2M), and machine-type communication (MTC) are implemented by beamforming, MIMO, and array antenna schemes. The application of a cloud RAN as the big data processing technology may be an example of convergence of the 5G technology and the IoT technology.

In NR which is new 5G communication, CIS-RS resources and SS blocks transmitted from a transmission and reception point (TRP) that transmits data through QCL information for coordinate multi-point (CoMP) transmission and beam-based transmission for data transmission may be indicated to a UE and the UE may determine reception beams used for data reception on the basis thereof and estimate Doppler and delay-related parameters.

At this time, an eNB may indicate information on CSI-RS resources which are quasi co-located (QCLed) to the UE in order to indicate a transmission and reception point (TRP) performing data transmission of the eNB and the UE and beams used for data transmission. If all beams supported by the eNB are QCL-configured and indicated through downlink control information (DCI), DCI overhead may become excessive when the number of beams supported by the eNB is large.

DISCLOSURE OF INVENTION

Technical Problem

The disclosure provides a method that makes a method of reducing DCI overhead and controlling additional overhead for QCL unnecessary by configuring in advance a plurality of CSI-RS resources for the QCL and using activated resources among them as QCL information in order to support semi-persistent CSI-RS resources. In addition, the disclosure also provides a method of using aperiodic CSI-RSs for QCL indication.

Solution to Problem

In accordance with an aspect of the disclosure, a method in a wireless communication system is provided. The method includes: receiving one or more pieces of quasi co-location (QCL) configuration information including information indicating a plurality of CSI-RS resources from an eNB; receiving downlink control information (DCI) including an indicator indicating one of the one or more pieces of QCL configuration information; estimating channel state information based on one or more of the plurality of CSI-RS resources; and receiving downlink data based on the channel state information, wherein the plurality of CSI-RS resources include at least one of periodic CSI-RS resources, semi-persistent CSI-RS resources, and aperiodic CSI-RS resources.

The channel state information may be estimated based on semi-persistent CSI-RS resources of which activation is indicated to a UE among the semi-persistent CSI-RS resources, the channel state information may be estimated based on aperiodic CSI-RSs received at a time point which is the closest to a time point at which the downlink data is received among the aperiodic CSI-RS resources, and the aperiodic CSI-RS resources and the semi-persistent CSI-RS resources may be used to estimate different pieces of channel state information.

In accordance with another aspect of the disclosure, a method in a wireless communication system is provided. The method includes: transmitting one or more pieces of quasi co-location (QCL) configuration information including information indicating a plurality of CSI-RS resources to a UE; transmitting downlink control information (DCI) including an indicator indicating one of the one or more pieces of QCL configuration information; and transmitting downlink data, wherein the downlink data is received based on channel state information estimated based on one or more of the plurality of CSI-RS resources, and the plurality of CSI-RS resources include at least one of periodic CSI-RS resources, semi-persistent CSI-RS resources, and aperiodic CSI-RS resources.

In accordance with another aspect of the disclosure, a UE in a wireless communication system is provided. The UE includes: a transceiver; and a controller configured to perform control to receive one or more pieces of quasi co-location (QCL) configuration information including information indicating a plurality of CSI-RS resources from an eNB, receive downlink control information (DCI) including an indicator indicating one of the one or more pieces of QCL configuration information, estimate channel state information based on one or more of the plurality of CSI-RS resources, and receive downlink data based on the channel state information, the controller being connected to the transceiver, wherein the plurality of CSI-RS resources include at least one of periodic CSI-RS resources, semi-persistent CSI-RS resources, and aperiodic CSI-RS resources.

In accordance with another aspect of the disclosure, an eNB in a wireless communication system is provided. The eNB includes: a transceiver; and a controller configured to perform control to transmit one or more pieces of quasi co-location (QCL) configuration information including information indicating a plurality of CSI-RS resources to a UE, transmit downlink control information (DCI) including an indicator indicating one of the one or more pieces of QCL configuration information, and transmit downlink data, the controller being connected to the transceiver, wherein the downlink data is received based on channel state information estimated based on one or more of the plurality of CSI-RS resources, and the plurality of CSI-RS resources include at least one of periodic CSI-RS resources, semi-persistent CSI-RS resources, and aperiodic CSI-RS resources.

Advantageous Effects of Invention

According to an embodiment of the disclosure, the UE and the eNB may efficiently perform coordinate multipoint (CoMP) transmission and beam-based data transmission without excessive overhead.

MODE FOR THE INVENTION

Figure 1:
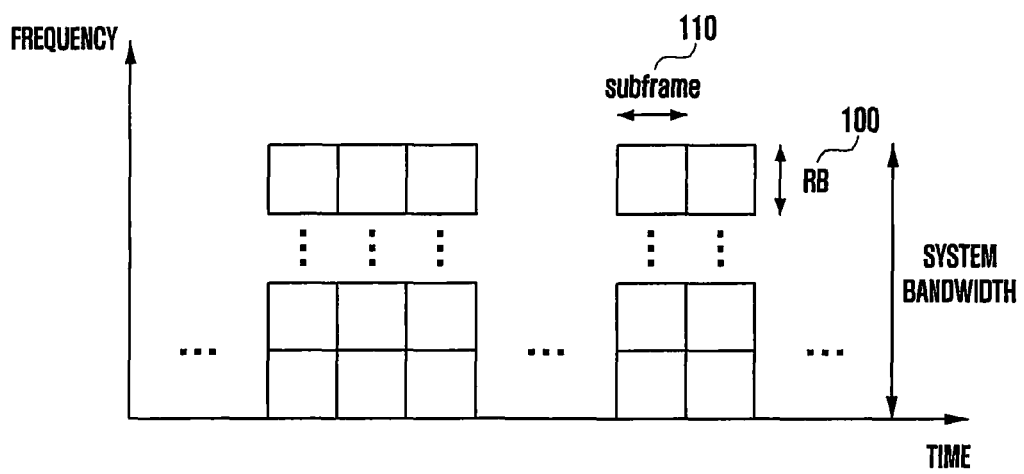
FIG. 1 illustrates time and frequency resources in LTE and LTE-A systems.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

In the following description of the disclosure, a detailed description of related well-known functions or structures incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The disclosure relates to a method of indicating quasi-co-location (QCL) and beam-related information required for transmitting data in a mobile communication system in which multiple input multiple output (MIMO) transmission is performed using a transmission antenna in a plurality of evolved node Bs (or gNBs) or a transmission and reception point (TRP).

From the early stage of providing voice-oriented services, a mobile communication system has evolved into a high-speed, high-quality wireless packet data communication system to provide data and multimedia services. Various mobile communication standards, such as high speed downlink packet access (HSDPA) and high speed uplink packet access (HSUPA), long term evolution (LTE), long term evolution-advanced (LTE-A) of the 3rd generation partnership project (3GPP), high rate packet data (HRPD) of the 3rd generation partnership project-2 (3GPP2), and 802.16 of IEEE, have recently been developed to support high-speed and high-quality wireless packet data transmission services. In particular, an LTE system, developed to efficiently support high-speed wireless packet data transmission, maximizes wireless system capability using various wireless access technologies. An LTE-A system is an advanced wireless system of an LTE system and has enhanced data transmission capability compared to the LTE system.

In general, LTE refers to an eNB and a user equipment corresponding to Release 8 or 9 of the 3GPP standard organization, and LTE-A refers to an eNB and a user equipment corresponding to Release 10 of the 3GPP standard organization. The 3GPP standard organization has standardized the LTE-A system and is now discussing the standard for a subsequent Release with improved performance based on the standardized LTE-A system.

Existing $3^{rd}$ and $4^{th}$ generation mobile communication system such as LTE/LTE-A use a MIMO technique of performing transmission using a plurality of transmission/reception antennas in order to expand a data transmission rate and system capacity. The MIMO technique transmits a plurality of information streams through a plurality of transmission/reception antennas in a spatial division manner. As described above, transmission of the plurality of information in the spatial division manner is referred to as spatial multiplexing. In general, the number of information streams to which spatial multiplexing can be applied may vary depending on the number of antennas of a transmitter and a receiver. The number of information streams to which spatial multiplexing can be applied is generally referred to as a rank of the corresponding transmission. In the case of the MIMO technique supported by the standards up to LTE-A release 11, spatial multiplexing is supported for 16 transmission antennas and 8 reception antennas and a maximum of 8 ranks are supported.

In the case of new radio (NR) access technology which is a currently discussed $5^{th}$-generation mobile communication system, supporting various services such as enhanced mobile broadband (eMBB), massive machine type communications (mMTC), and ultra-reliable and low-latency communications (URLLC) is a design aim of the system, and time and frequency resources are flexibly used by minimizing reference signals which are always transmitted for the aim and aperiodically transmitting the reference signals.

Hereinafter, in the specification, although an NR system (hereinafter, interchangeable with NR), an LTE system, and an LTE-A system (hereinafter, interchangeable with LTE) are described by way of example, the disclosure can be applied to other communication systems using a licensed band and an unlicensed band without separate addition and subtraction.

FIG. 1 illustrates time and frequency resources in LTE and LTE-A systems.

In FIG. 1, radio resources which an evolved Node B (eNB) transmits to a user equipment (UE) are divided in units of resource blocks (RBs) 100 on a frequency axis and subframes 110 on a time axis. In the LTE and LTE-A systems, the RB generally consists of 12 subcarriers and occupies a band of 180 kHz. In contrast, the subframe generally consists of 14 OFDM symbol intervals and occupies a time interval of 1 msec in the LTE and LTE-A systems. In scheduling of the LTE and LTE-A systems, resources may be allocated in units of subframes on the time axis and in units of RBs on the frequency axis.

Figure 2:
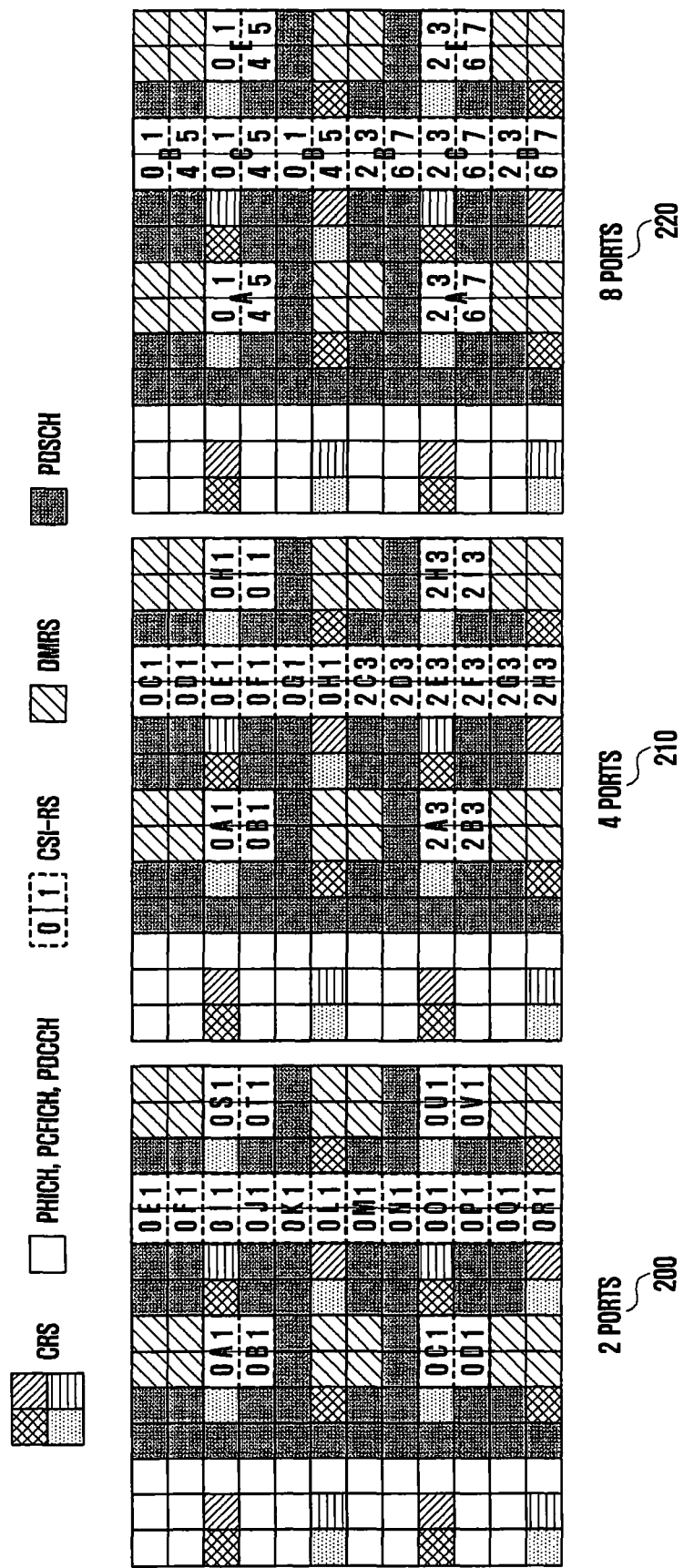
FIG. 2 illustrates CSI-RS transmission using radio resources of 1 subframe and 1 RB which are a minimum unit for downlink scheduling in the LTE-A system.

FIG. 2 illustrates CSI-RS transmission of 2, 4, and 8 antenna ports (interchangeable with APs or ports) using radio resources of 1 subframe and 1 RB which are the minimum unit of downlink scheduling in the LTE-A system. Reference numeral 200 indicates CSI-RS transmission using 2 antenna ports, reference numeral 210 indicates CSI-RS transmission using 4 antenna ports, and reference numeral 220 indicates CSI-RS transmission using 8 antenna ports.

The radio resources illustrated in FIG. 2 consist of 12 subcarriers in a frequency domain and 14 OFDM symbols in a time domain and thus have a total of 168 unique frequency and time locations. In the LTE and LTE-A systems, each unique frequency and time location of FIG. 2 is referred to as a resource element (RE).

Through the radio resources of FIG. 2, a plurality of different types of signals below may be transmitted.

1. Cell-specific reference signal (CRS): indicates a reference signal transmitted for all UEs belonging to one cell 2. Demodulation reference signal (DMRS): indicates a reference signal transmitted for a specific UE and is used for performing channel estimation to reconstruct information carried on a PDSCH. One DMRS port is transmitted after precoding which is the same as that of a PDSCH layer connected thereto is applied. The UE which desires to receive a specific layer of the PDSCH receives a DMRS port connected to the corresponding layer, performs channel estimation, and then reconstructs information carried on the corresponding layer.

3. Physical downlink shared channel (PDSCH): indicates a data channel transmitted in downlink, and is used when the eNB transmits traffic to the UE and transmitted using an RE through which no reference signal is transmitted in a data region 4. Channel status information reference signal (CSI-RS): indicates a reference signal transmitted for UEs belonging to one cell and is used to measure a channel status. A plurality of CSI-RSs may be transmitted in one cell.

5. Zero power CSI-RS: indicates that no actual signal is transmitted at the location at which the CSI-RS is transmitted.

6. Interference measurement resource (IMR or CIS-IM): corresponds to the location at which the CSI-RS is transmitted, and one or a plurality of A, B, C, D, E, F, G, H, I, and J may be configured as the IMR in FIG. 2. The UE performs interference measurement based on the assumption that all signals received in REs configured as the IMRs are interference.

7. Other control channels (a physical hybrid-ARQ indicator channel (PHICH), a physical control format indicator channel (PCFICH), and a physical downlink control channel (PDCCH)): used when the UE provides control information required for receiving a PDSCH or transmits ACK/NACK for operating hybrid automatic repeat request (HARQ) of uplink data transmission.

In the LTE-A system, the zero power CSI-RS may be configured such that CSI-RSs transmitted by different eNBs are received by UEs of the corresponding cell without interference. The zero power CSI-RS may be applied to the location at which the CSI-RS may be transmitted, and generally, the UE may skip the corresponding radio resources and receive a traffic signal. In the LTE-A system, the zero power CSI-RS is also called muting. This is because the zero power CSI-RS is applied to the location of the CSI-RS and no transmission power is transmitted due to a characteristic of the zero power CSI-RS.

In FIG. 2, CSI-RSs may be transmitted using portions of the locations marked by A, B, C, D, E, F, G, H, I, and J according to the number of antennas for transmitting the CSI-RSs. In addition, the muting may also be applied to portions of the locations marked by A, B, C, D, E, F, G, H, I, and J. Particularly, CSI-RSs may be transmitted through 2, 4, or 8 REs according to the number of transmission antenna ports. The CSI-RSs are transmitted in half of a particular pattern in FIG. 2 if the number of antenna ports is 2, the CSI-RSs are transmitted in the entirety of the particular pattern if the number of antenna ports is 4, and the CSI-RSs are transmitted using two patterns if the number of antenna ports is 8. In contrast, the muting is always applied in units of one pattern. That is, the muting may be applied to a plurality of patterns but cannot be applied only to a portion of one pattern if the location does not overlap a CSI-RS. However, only when the locations of the CSI-RS and the muting overlap each other, the muting may be applied only to a portion of one pattern.

If the CSI-RSs for two antenna ports are transmitted, the signal of each antenna port is transmitted in two REs contiguous on the time axis, and the signals of the antenna ports may be distinguished by orthogonal code. Further, if CSI-RSs for four antenna ports are transmitted, in addition to the CSI-RSs for the two antenna ports, signals for the remaining two antenna ports are transmitted in the same way as the above using additional two REs. The above description is applied to the case in which CSI-RSs for 8 antenna ports are transmitted.

The eNB may boost transmission power of the CSI-RS in order to improve channel estimation accuracy. If CSI-RSs of 4 or 8 antenna ports are transmitted, a specific CSI-RS port is transmitted only in a CSI-RS RE at a predetermined location and is not transmitted in another OFDM symbol within the same OFDM symbol.

Figure 3A:
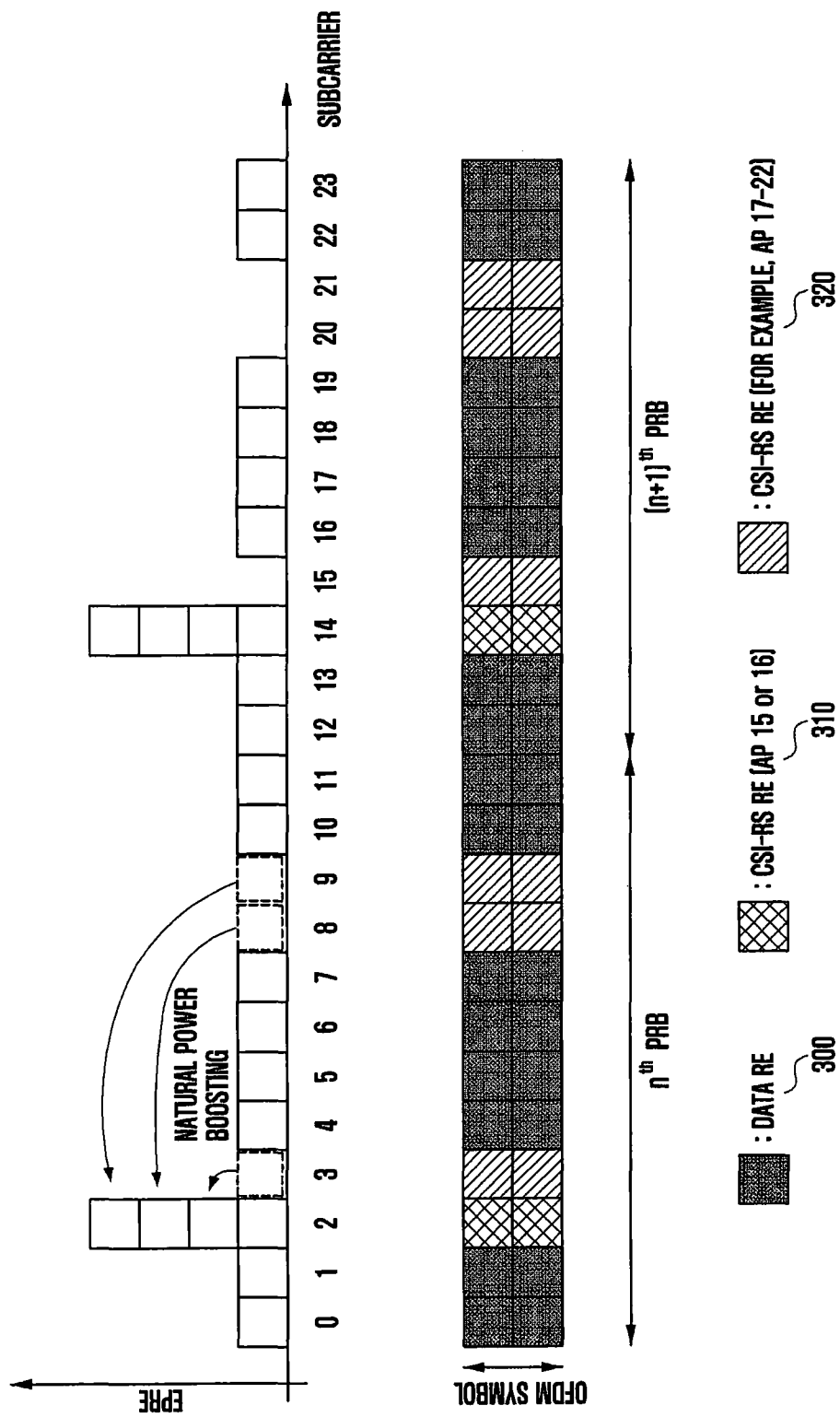
FIG. 3A illustrates an example of CSI-RS RE mapping for $n^{th}$ and $n+1^{th}$ PRBs in the case in which the eNB transmits 8 CSI-RSs.

FIG. 3A illustrates an example of CSI-RS RE mapping of $n^{th}$ and $n+1^{th}$ physical resource blocks (PRBs) when the eNB transmits 8 CSI-RSs. As illustrated in FIG. 3A, if the CSI-RS RE location for a $15^{th}$ or $16^{th}$ AP is as indicated by reference numeral 310, transmission power of the $15^{th}$ or $16^{th}$ AP is not used in CSI-RS REs 320 for the remaining $17^{th}$ to $22^{nd}$ APs. Accordingly, as illustrated in FIG. 3A, the $15^{th}$ or $16^{th}$ AP may use transmission power, to be used for $3^{rd}$, $8^{th}$, and $9^{th}$ subcarriers, for a $2^{nd}$ subcarrier. The natural power boosting enables power of the $15^{th}$ CSI-RS port transmitted through the $2^{nd}$ subcarrier to be higher by a maximum of 6 dB than transmission power used in a data RE 300. If the current 2/4/8 port CSI-RS patterns are used, natural power boosting of 0/2/6 dB can be performed, respectively, and each AP may transmit the CSI-RS with full power utilization.

If CSI-RSs of 12 and 16 antenna ports larger than 8 antenna ports are transmitted, locations at which CSI-RSs of 4 and 8 antenna ports are transmitted are combined through RRC configuration and then the 12 and 16 CSI-RSs are transmitted in the prior art. In other words, if 12 CSI-RSs are transmitted, three 4-port CSI-RS transmission locations are grouped and one 12-port CSI-RS is transmitted. If 16 CSI-RSs are transmitted, two 8-port CSI-RS transmission locations are grouped and one 16-port CSI-RS is transmitted. A maximum of 32 CSI-RS ports may be configured in the UE based on LTE-A release 14 and also equally configured in NR.

Further, one difference of 12 or larger-port CSI-RS transmission from 8 or smaller-port CSI-RS transmission equal is that CDM having the size of 4 or 8 is supported. The conventional CSI-RSs of 8 or fewer ports may support code division multiplexing (CDM)-2 and overlappingly transmit CSI-RS 2 ports in 2 time symbols, thereby supporting power boosting of a maximum of 6 dB based on 8 ports and using the whole power for CSI-RS transmission. However, in the case of CSI-RSs of 12 ports or 16 ports, the whole power cannot be used for CSI-RS transmission through a combination of CDM-2 and 6 dB. Accordingly, CDM-4 or CDM-8 is supported to use the whole power.

Further, the UE may receive allocation of CSI-IM as well as the CSI-RS, and CSI-IM resources of LTE have the same resource structure and location as those of the CSI-RS supporting 4 ports. The CSI-IM corresponds to resources for accurately measuring interference from adjacent eNBs by the UE receiving data from one or more eNB. If the eNB desires to measure an amount of interference when the adjacent eNB transmits data and an amount of interference when the adjacent eNB does not transmit data, the eNB may configure the CSI-RS and two CSI-IM resources to effectively measure the amounts of interference from the adjacent eNB by allowing the adjacent eNB to always transmit a signal in one CSI-IM and allowing the adjacent eNB to not always transmit a signal in the other CSI-IM. NR supports not only ZP-CSI-RS-based CSI-IM supported in LTE but also non zero-power (NZP) CSI-RS-based CSI-IM, and thus additionally supports an operation for emulating interference through precoding information for interference information indicated to the UE in advance and reporting channel state information reflecting the interference.

[Table 1] below shows radio resource control (RRC) fields for CSI-RS configuration.

TABLE 1

| CSI-RS config | CSI-IM config | CQI report config | Etc |
| --- | --- | --- | --- |
| Number of antenna ports Resource config Time and frequency locations within subframe Subframe config Period and subframe offset QCL-CRS-info (QCL type B) CRS information for CoMP | Resource config Time and frequency locations within subframe Subframe config Period and subframe offset | Periodic mode, resources, period, and offset Aperiodic mode PMI/RI report CSI process based on RI Subframe pattern | Pc Codebook subset restriction |

Configuration for reporting a channel state on the basis of periodic CSI-RSs within a CSI process may be classified into four types as shown in [Table 1]. CSI-RS config is to configure frequency and time locations of a CSI-RS RE. The number of ports of the corresponding CSI-RS is configured through the configuration of the number of antennas. Resource config configures an RE location within an RB, and Subframe config configures a period and an offset of a subframe. [Table 2] is a table for Resource config currently supported by LTE, and [Table 3] is a table for Subframe config.

TABLE 2

| | | Number of CSI reference signals configured | | | | | |
| --- | --- | --- | --- | --- | --- | --- | --- |
| CSI reference signal | | 1 or 2 | | 4 | | 8 | |
| | configuration | $(k', l')$ | $n_s$ mod 2 | $(k', l')$ | $n_s$ mod 2 | $(k', l')$ | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3,2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |

TABLE 2-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

The UE can identify frequency and time locations, a period, and an offset of a CSI-RS through [Table 2] and [Table 3] above. QCL-CRS-info configures quasi co-location (QCL) information for CoMP. CSI-IM config is to configure frequency and time locations of a CSI-IM for measuring interference. The CSI-IM is always configured on the basis of 4 ports, and thus the configuration of the number of antenna ports is not needed, and Resource config and Subframe config are configured through the same method as the CSI-RS. CQI report config exists to configure how to report a channel state using the corresponding CSI process. The corresponding configuration may include periodic channel state report configuration, aperiodic channel state report configuration, PMI/RI report configuration, RI reference CSI process configuration, and subframe pattern configuration.

In measurement of a channel and interference which the UE receives, the subframe pattern is to configure a measurement subframe subset for supporting channel and interference measurement having temporally different characteristics. The measurement subframe subset was first introduced to reflect and estimate different interference characteristics between an almost blank subframe (ABS) and a normal subframe which is not the ABS in enhanced inter-cell interference coordination (eICIC). Thereafter, in order to measure different channel characteristics between a subframe always operating in downlink and a subframe which can dynamically switch from downlink to uplink in enhanced interference mitigation and traffic adaptation (eIMTA), the development has been made to configure 2 IMRs and perform measurement. Further, $P_C$ indicating a power ratio between a PDSCH required for generating a channel state report by the UE and a CSI-RS RE and codebook subset restriction for configuring which codebook will be used may be included. The $P_C$ may be defined as [Equation 1] and designate a value between −8 and 15 dB.

$$P_C = \frac{PDSCH\ EPRE}{CSI-RS\ EPRE} \qquad \text{[Equation 1]}$$

The eNB may variably control CSI-RS transmission power for various purposes such as improvement of channel estimation accuracy, and the UE may be aware of by how much transmission power to be used for data transmission is higher or lower than transmission power used for channel estimation on the basis of the provided $P_C$. For the reason, the UE can calculate accurate CQI even though CSI-RS transmission power of the eNB is variable and report the same to the eNB.

In the cellular system, the eNB should transmit a reference signal to the UE in order to measure a downlink channel state. In the LTE-A system, the UE measures a channel state between the eNB and the UE on the basis of a CRS or a CSI-RS transmitted by the eNB. In association with the channel state, several factors need to be basically considered, and the amount of interference in downlink is included therein. The amount of interference in downlink may include an interference signal generated by an antenna belonging to a neighboring eNB and a thermal noise, which is important when the UE determines a downlink channel state. For example, if the eNB having one transmission antenna transmits a signal to the UE having one reception antenna, the UE should determine energy per symbol which can be received through downlink on the basis of the reference signal received from the eNB and amounts of interference to be simultaneously received in an interval in which the corresponding symbol is received and should determine energy per symbol-to-interference ratio (Es/Io). The determined Es/Io is converted to a data transmission rate or a value corresponding thereto and transmitted to the eNB in the form of a channel quality indicator (CQI), and thus the eNB may determine a data transmission rate at which the eNB performs downlink transmission to the UE.

In the LTE-A system, the UE feeds back information associated with a downlink channel state to the eNB so that the eNB can utilize the same for downlink scheduling. That is, the UE measures a reference signal which the eNB transmits through the downlink and transmits feedback of information extracted therefrom to the eNB in a form defined by the LTE and LTE-A standard. In LTE and LTE-A systems, information fed back by the UE largely includes three pieces of information below.

Rank indicator (RI): indicates the number of spatial layers in which the UE can receive in a current channel state Precoder matrix indicator (PMI): indicates an indicator of a precoding matrix which the UE prefers in a current channel state Channel quality indicator (CQI): indicates a maximum data rate at which the UE can perform reception in a current channel state, and may be replaced with an SINR, a maximum error correction code rate and modulation scheme, and data efficiency per frequency which can be used similarly to the maximum data rate.

The RI, the PMI, and the CQI are interrelated. For example, the precoding matrix supported by LTE and LTE-A may be defined differently for each rank. Accordingly, even though the value of the PMI when the RI is 1 and the value of the PMI when the RI is 2 are the same as each other, they are interpreted differently. Further, the UE assumes that the value of the RI which the UE provides to the eNB when the CQI is determined and the values of the PMI are applied to the eNB. That is, if the UE provides RI_X, PMI_Y, and CQI_Z to the eNB, it means that the UE can perform reception at a data transmission rate corresponding to CQI_Z based on the assumption that the rank is RI_X and the precoding is PMI_Y. As described above, when the UE calculates CQI, the UE considers which transmission scheme is used by the eNB and thus acquires optimal performance in actual transmission using the corresponding transmission scheme.

Figure 3B:
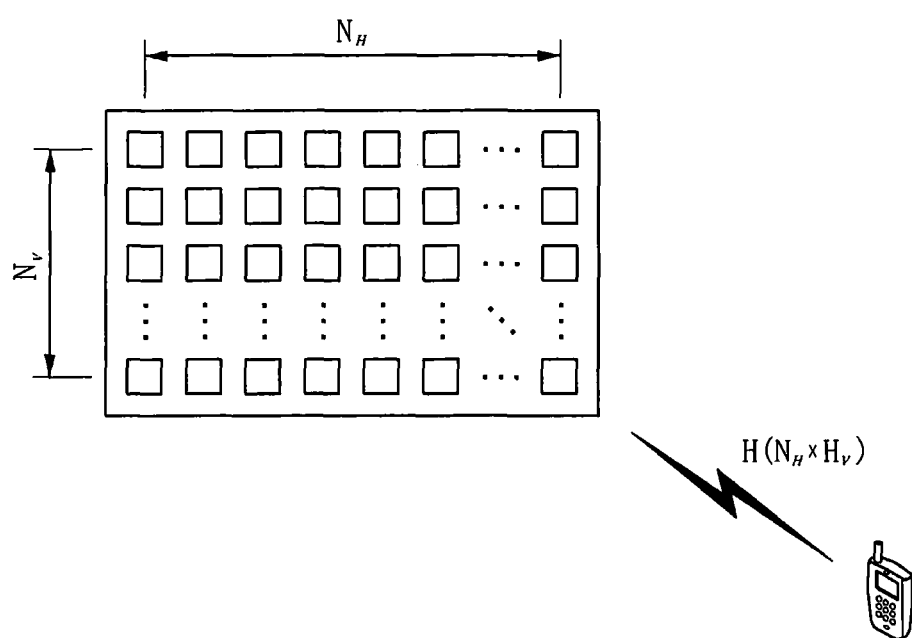
FIG. 3B illustrates a communication system to which the disclosure is applied.

FIG. 3B illustrates a communication system to which the disclosure is applied;

In FIG. 3B, an eNB transmission equipment transmits radio signals through scores or more of transmission antennas. A plurality of transmission antennas are arranged to have a predetermined distance therebetween as illustrated in FIG. 3B. The predetermined distance may correspond to, for example, a multiple of half a wavelength of a transmitted radio signal. In general, if the distance corresponding to the half the wavelength of the radio signal is maintained between transmission antennas, signals transmitted by respective transmission antennas are influenced by radio channels having low correlation therebetween. As the distance between the transmission antennas is longer, correlation between signals becomes smaller.

The eNB transmission equipment having large-scale antennas may arrange antennas in two dimensions as illustrated I FIG. 3B in order to prevent the scale of the equipment from being very large. In this case, the eNB transmits signals through $N_H$ antennas arranged on the horizontal axis and $N_V$ antennas arranged on the vertical axis, and the UE measures channels of the corresponding antennas.

In FIG. 3B, dozens or more of transmission antennas arranged in the eNB transmission equipment are used to transmit signals to one or a plurality of UEs. Appropriate precoding is applied to a plurality of transmission antennas and signals are simultaneously transmitted to a plurality of UEs therethrough. At this time, one UE may receive one or more information streams. In general, the number of information streams which one UE can receive is determined according to the number of reception antennas which the UE occupies and a channel condition.

In order to effectively implement the MIMO system, the UE is required to accurately measure the channel condition and the size of interference and transmit effective channel state information to the eNB therethrough. The eNB receiving the channel state information determines UEs to which downlink data is transmitted, a data transmission rate at which data is transmitted, and precoding to be applied on the basis of the channel state information. In the NR system, the number of transmission antennas is larger than the conventional LTE/LTE-A systems due to the development of hardware and the use of a higher band, so that if a method of transmitting and receiving channel state information of the conventional LTE and LTE-A systems is applied, an uplink overhead problem in which much control information should be transmitted in uplink may occur.

Further, in the mobile communication system, time, frequency, and power resources are limited. Therefore, if larger resources are allocated to reference signals, resources which may be allocated to traffic channel (data traffic channel) transmission become smaller, and thus, an absolute amount of transmitted data may be reduced. In this event, the performance of channel measurement and estimation is improved, but an absolute amount of transmitted data is reduced and thus the overall system capacity performance may be rather reduced.

Accordingly, it is required to appropriately distribute resources for transmission of reference signals and traffic channels in order to derive the optimal performance in an aspect of the overall system capacity.

The eNB having large-scale antennas should configure resources for measuring channels of 8 or more antennas and transmit the resources to the UE as illustrated in FIG. 3B, and a maximum of 40 REs can be used as illustrated in FIG. 2, but one cell can actually use 2, 4, or 8 REs. Accordingly, in order to support channel measurement for large-scale antennas required by the NR system, 16 and 32 CSI-RS patterns which are not supported by the current system and configuration and transmission of a plurality of CSI-RS resources are needed. The CSI-RS resources should be designed in consideration of various aspects such as power boosting and implementation of a radio channel estimator to accurately and efficiently generate CSI.

Figure 4:
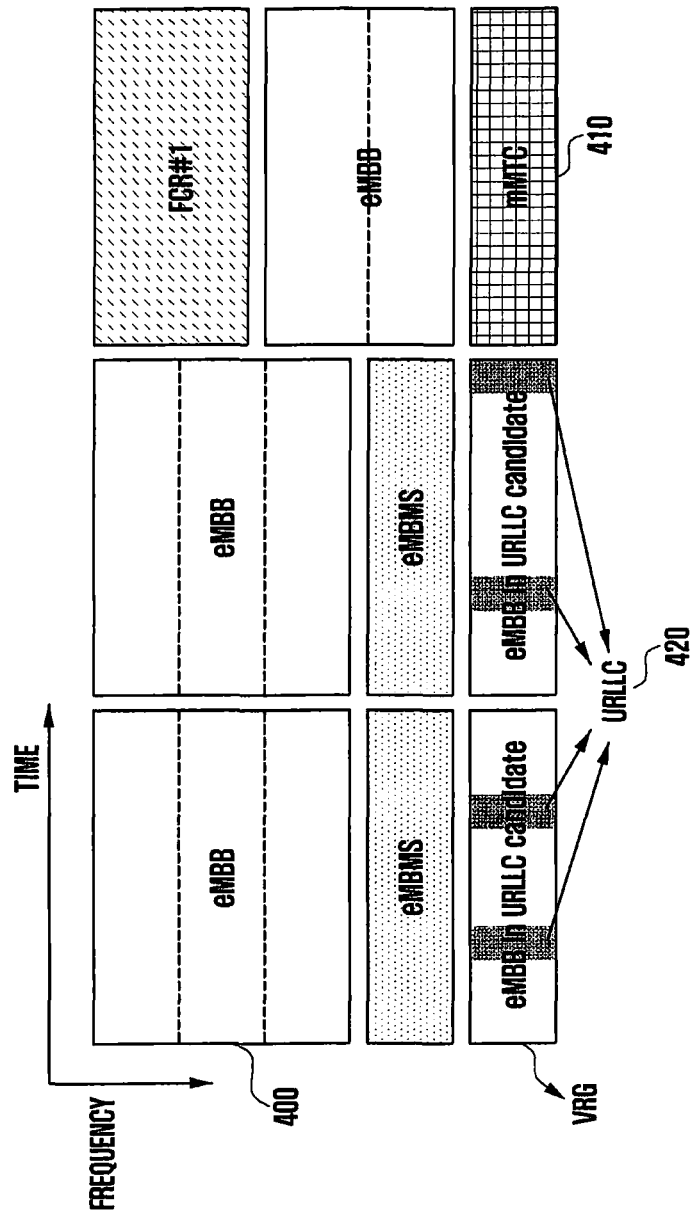
FIG. 4 illustrates an example in which data of eMBB, URLLC, and mMTC considered in the NR system is allocated to frequency-time resources along with forward compatible resources.

FIG. 4 illustrates an example in which data of eMBB, URLLC, and mMTC considered in the NR system is allocated in frequency-time resources along with forward compatible resources (FCR).

If URLLC data 420 is generated and transmission thereof is needed while eMBB 400 and mMTC 410 are allocated to and transmitted in specific frequency bands, a transmitter empties parts to which the eMBB 400 and the mMTC 410 were allocated in advance and transmits the URLLC data 420. Among the services, the URLLC attaches importance to a short delay time, and thus URLLC data may be allocated to and transmitted in a port of resources to which the eMBB is allocated, and the eMBB resources may be known to the UE in advance. To this end, eMBB data may not be transmitted in frequency-time resources in which the eMBB data and URLLC data overlap each other, and accordingly, transmission performance of the eMBB data may decrease. That is, in the above case, eMBB data transmission may fail due to URLLC allocation. At this time, the length of a transmission time interval (TTI) used for URLLC transmission may be shorter than the length of a TTI used for eMBB or mMTC transmission.

During a process in which the UE accesses a wireless communication system, a synchronization signal may be used to acquire synchronization with a cell within the network. More specifically, the synchronization signal is a reference signal which the eNB transmits for time and frequency synchronization and a cell search in initial access of the UE, and signals such as a primary synchronization signal (PSS) and a secondary synchronization signal (SSS) may be transmitted for synchronization in LTE.

Figure 5:
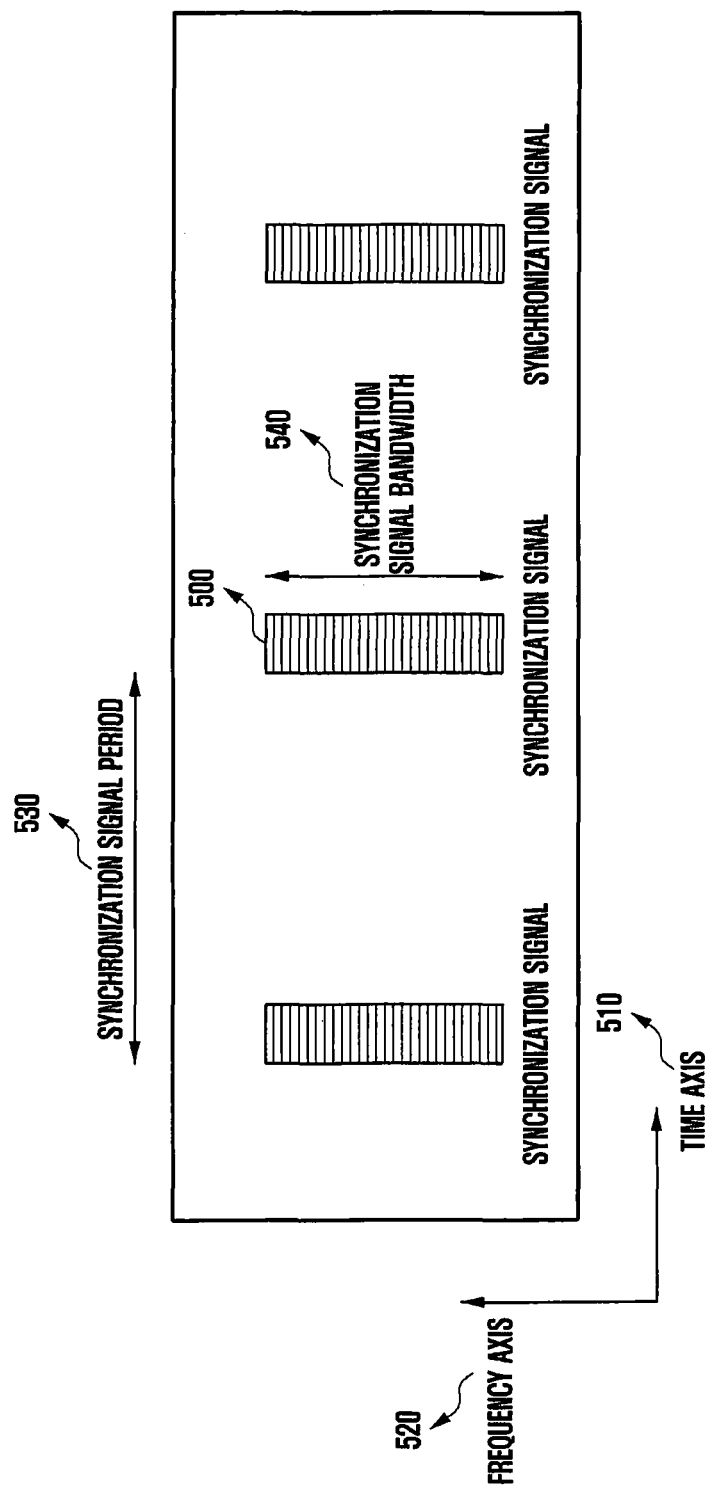
FIG. 5 illustrates an embodiment in which a synchronization signal is transmitted in a 5G communication system considered by the disclosure.

FIG. 5 illustrates an embodiment in which a synchronization signal is transmitted in a 5G communication system considered by the disclosure.

In FIG. 5, a synchronization signal 500 may be periodically transmitted at intervals of a predetermined period 530 on a time axis 510. Further, the synchronization signal 500 may be transmitted with a predetermined synchronization signal transmission bandwidth 540 on a frequency axis 520. For the synchronization signal, a specific sequence may be mapped to a subcarrier within the transmission bandwidth 540 in order to indicate a cell ID. A cell number may be mapped by one sequence or a combination of a plurality of sequences, and accordingly the UE may detect a number of a cell which the UE desires to access by detecting the sequence used for the synchronization signal. The sequence used for the synchronization signal may be a pseudo random noise sequence such as an M-sequence or a gold sequence. Further, the synchronization signal 500 may be configured using a plurality of OFDM symbols. At this time, the sequence for a plurality of different synchronization signals may be mapped to each OFDM symbol. For example, similar to LTE, the PSS may be generated using 3 Zadoff-Chu sequences and the SSS may be generated using the gold sequence. Further, the gold sequence may be used for both the PSS and the SSS.

In LTE, the PSS of one cell may have three different values according to physical layer cell IDs of the cell, and three cell IDs within one cell ID group correspond to different PSSs. Accordingly, the UE may detect the PSS of the cell and identify one cell ID group among three cell ID groups supported by LTE. The UE additionally detects the SSS in 168 cell IDs which are decreased from 504 cell IDs through the cell ID group identified through the PSS and finally knows the cell ID to which the corresponding cell belongs. NR supports 1008 cell IDs increased in comparison to LTE. The PSS may support 3 cell groups like in LTE and the SSS may detect 336 cell ID to identify a final cell ID on the basis thereof.

As described above, the UE acquires synchronization with the cell within the network, obtains the cell ID, and finds cell frame timing. If the UE succeeds, the UE should receive important cell system information. The cell system information is information which is repeatedly broadcasted by the network and which the UE should know to access the cell and appropriately operate within the cell generally. In LTE, system information is transmitted through two different transmission channels, a limited amount of system information called a master information block (MIB) is transmitted using a physical broadcast channel (PBCH) and an important part of the system information corresponding to a system information block (SIB) is transmitted using a physical downlink shared channel (PDSCH). More specifically, system information included in the MIB includes a downlink transmission bandwidth, physical hybrid ARQ indicator channel (PHICH) configuration information, and a system frame number (SFN).

In the 5G communication system, a PBCH may be transmitted as follows. The PBCH may be periodically transmitted at a predetermined period interval on the time axis. Further, the PBCH may be transmitted within a predetermined PBCH transmission bandwidth on the frequency axis. The eNB may transmit the same signals on the PBCH at a predetermined period interval in order to improve coverage, and the UE may combine and receive the signals. For the PBCH, the disclosure assumes that the aforementioned PBCH is used but is not limited to a specific structure. The PBCH may be scattered to resources of the time-frequency domain, and a DMRS may be additionally transmitted for PBCH decoding since there is no CRS in the case of NR.

Figure 6:
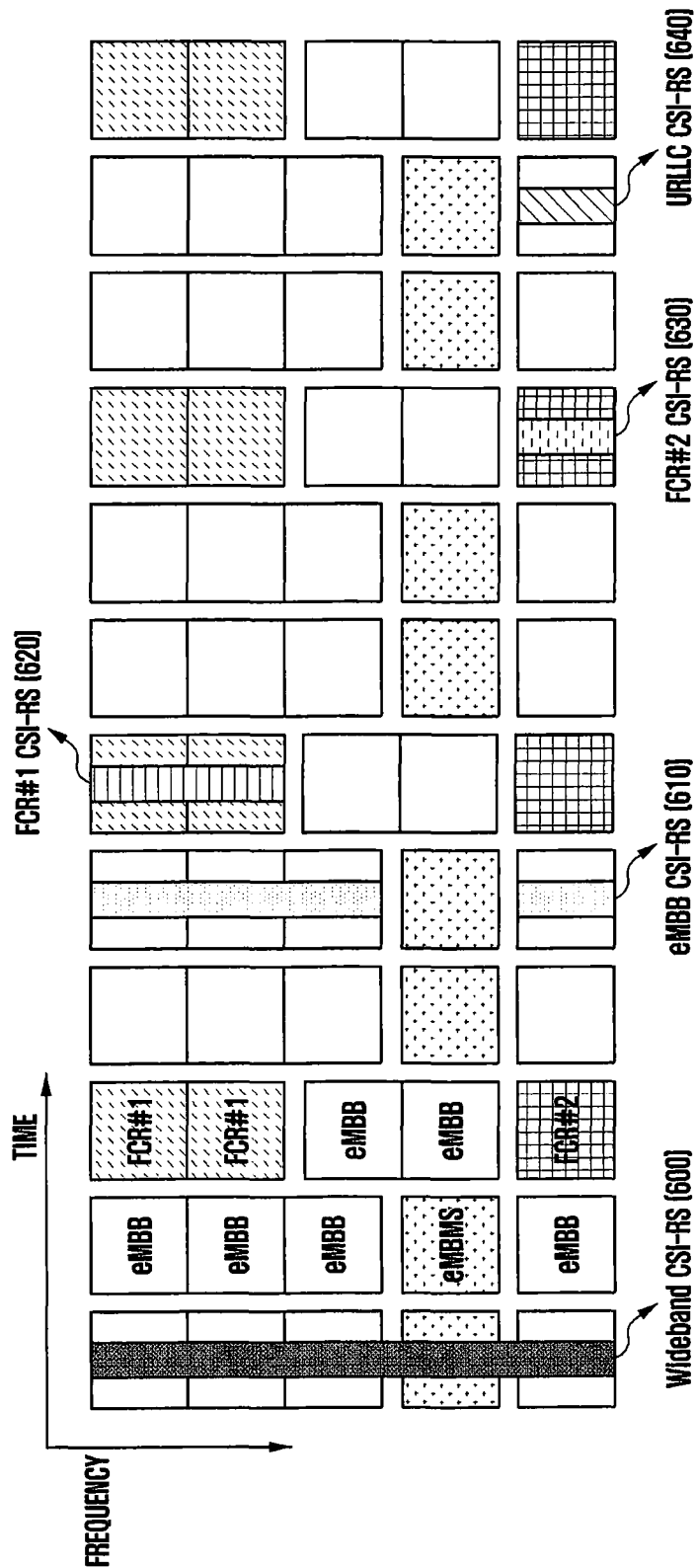
FIG. 6 illustrates an example in which respective services are multiplexed in time and frequency resources of the NR system.

FIG. 6 illustrates an example in which respective services are multiplexed in time and frequency resources of the NR system.

The eNB may allocate CSI-RSs (broadband CSI-RS or wideband CSI-RS) to the UE in an entire band or a plurality of bands in order to secure initial channel state information as indicated by reference numeral 600. Since the CSI-RSs in the entire band or the plurality of bands require a large amount of reference signal overhead, it may be disadvantageous to optimize the system performance but, if there is no information secured in advance, CSI-RS transmission in the entire band or the plurality of bands may be necessary. After CSI-RS transmission in the entire band or the plurality of bands, respective services may be provided with different requirements and thus the need of accuracy and updating of required channel state information may be different. Accordingly, after securing the initial channel state information, the eNB may trigger subband CSI-RSs 610, 620, 630, and 640 for respective services in the corresponding band according to the need of services. Although FIG. 6 illustrates that CSI-RSs are transmitted for one service at one time point, CSI-RSs may be transmitted for a plurality of services as necessary.

As illustrated in [Table 1] and [Table 2], periodic CSI-RS transmission is supported by LTE. The periodic CSI-RS may allow the UE to periodically measure resources, so that the UE may report periodic channel state information (CSI) therethrough. However, the periodic CSI-RS transmission is not advantageous in supporting conventional LTE and the future UE. For example, if the CSI-RS pattern of LTE described above is different from the CSI-RS pattern of NR, ZP CSI-RS resources may be additionally consumed to perform rate matching of the corresponding LTE CSI-RS resources. If the form of CSI-RSs supported by NR in the future is different from the conventional CSI-RSs, the conventional NR UE and the future NR UE should support and use different CSI-RS patterns, and in this case, the periodic CSI-RSs may further increase overhead. In consideration thereof, NR supports semi-persistent and aperiodic CSI-RS transmission in addition to the periodic CSI-RS transmission.

The semi-persistence CSI-RS (hereinafter, interchangeable with an S-CSI-RS) transmission is a method of supporting more dynamic and flexible CSI-RS transmission in comparison with the conventional RRC-based CSI-RS transmission. The conventional periodic CSI-RS may be configured using an RRC-based configuration. In the RRC configuration, it takes a relatively long time for configuration and release. Accordingly, if the corresponding CSI-RS is not needed according to a condition of the eNB, CSI-RS resources are continuously wasted during a time for the release. NR is required to consider a mmWave band, and consumption of CSI-RS resources is more serious than conventional LTE or LTE-A since a plurality of beams are used in the band. Accordingly, NR introduces the semi-persistence CSI-RS and thus supports flexible and dynamic activation and deactivation of periodic CSI-RS transmission. As a result, the eNB may minimize a waste of CSI-RS resources and maximize the system performance.

In order to configure and activate/deactivate the semi-persistent CSI-RS, the following method may be considered.

Semi-persistent CSI-RS resource configuration and activation method 1: indicates a method by which the eNB configures a plurality of aperiodic CSI-RS resources through RRC in advance, activates some of the configured resources through DCI, and periodically transmits CSI-RSs until the corresponding CSI-RS resources are deactivated.

Aperiodic CSI-RS resource configuration and activation method 2: indicates a method by which the eNB configures a plurality of aperiodic CSI-RS resources through RRC in advance, activates some of the configured resources as candidate resources for DCI activation through a MAC control element (CE), activates some of the activated resources through DCI, and periodically transmits CSI-RSs until the corresponding CSI-RS resources are deactivated.

Aperiodic CSI-RS resource configuration and activation method 3: indicates a method by which the eNB configures a plurality of aperiodic CSI-RS resources through RRC in advance, activates some of the configured resources through a MAC CE, and periodically transmits CSI-RSs until the corresponding CSI-RS resources are deactivated.

Figure 7:
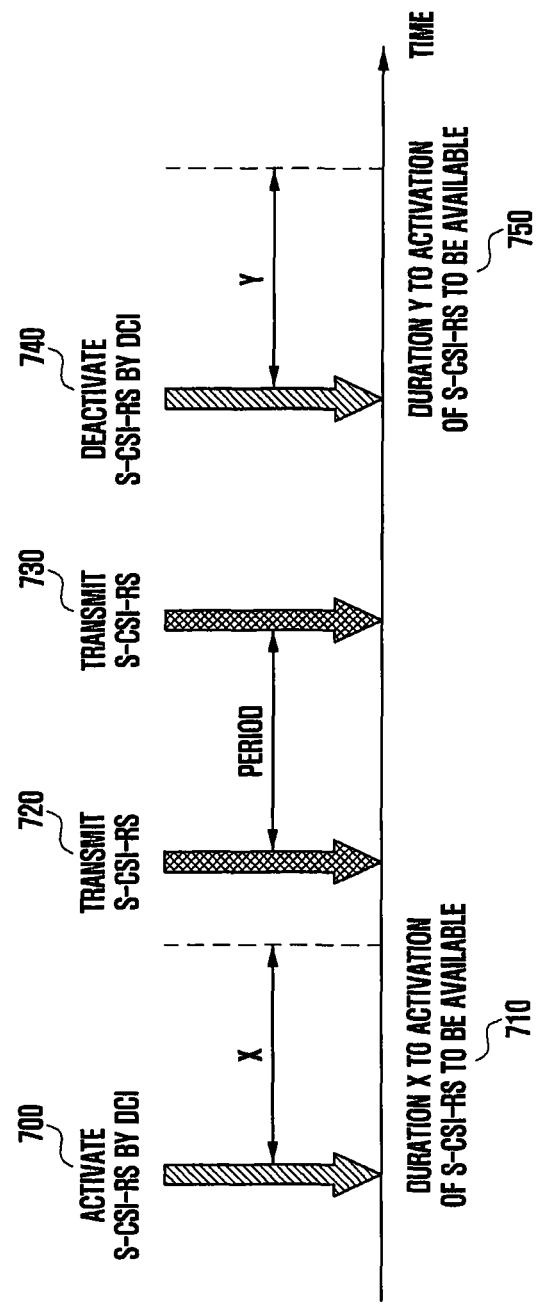
FIG. 7 illustrates an example of the operation of semi-persistent CSI-RS configuration and activation method 1.

FIG. 7 illustrates an example of the operation of semi-persistent CSI-RS configuration and activation method 1.

Semi-persistent CSI-RS configuration and activation method 1 is a method by which the eNB configures a plurality of semi-persistent CSI-RS resources in the UE in advance and activates some of the configured resources through DCI. Specifically, the eNB activates S-CSI-RSs through the DCI as indicated by reference numeral 700. A time of X is needed to activate the S-CSI-RSs after reception of the DCI as indicated by reference numeral 710. After the time of X, the eNB periodically transmits the S-CSI-RSs to the UE as indicated by reference numerals 720 and 730. Thereafter, the eNB deactivates the S-CSI-RSs through the DCI as indicated by reference numeral 740 and needs a time of Y until deactivation of the S-CSI-RS becomes possible after reception of the DCI as indicated by reference numeral 750.

In the method, since the eNB activates semi-persistent CSI-RS resources through the DCI, a plurality of resources required for activating the semi-persistent CSI-RS resources may be dynamically activated all the time, and accordingly, most dynamic and flexible semi-persistent CSI-RS activation and deactivation may be supported. However, since all CSI-RS resources should be configured in advance and should be candidates for indicating activation and deactivation, complexity of hardware for CSI-RS measurement by the UE and DCI reception overhead may be relatively large and DCI coverage may be reduced.

Figure 8:
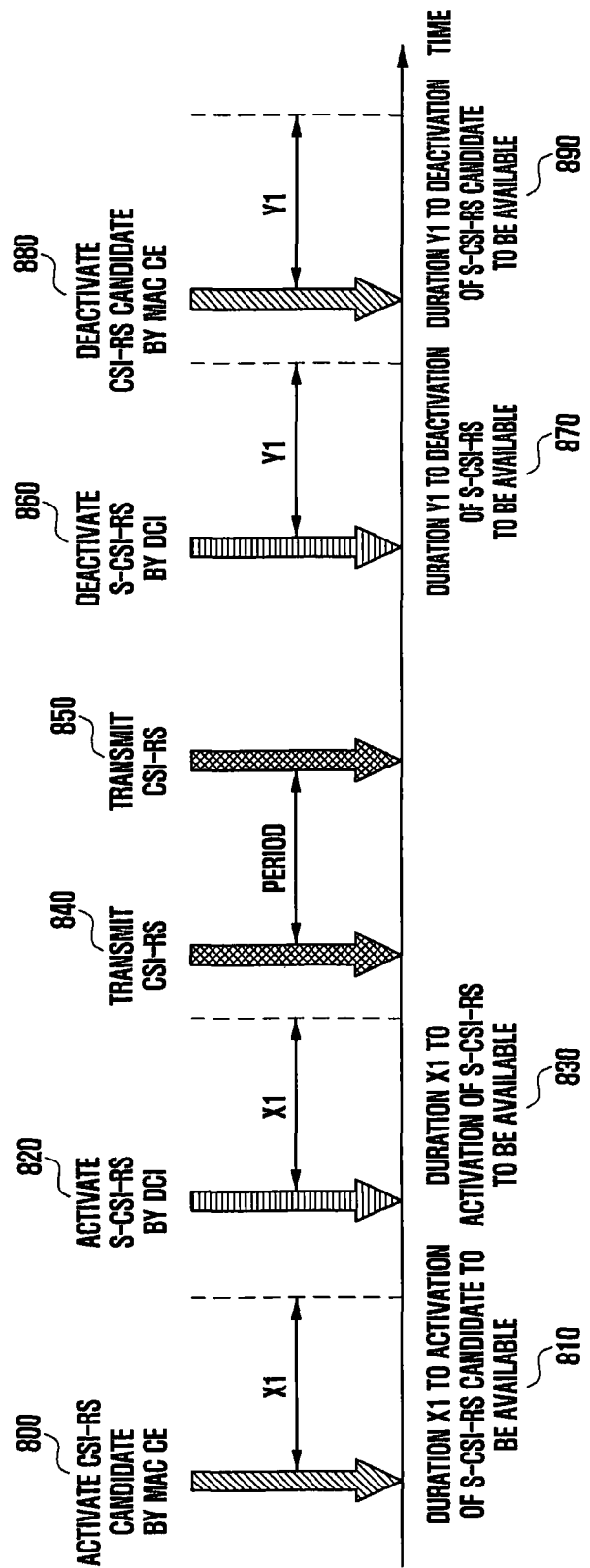
FIG. 8 illustrates an example of the operation of semi-persistent CSI-RS configuration and activation method 2.

FIG. 8 illustrates an example of the operation of semi-persistent CSI-RS configuration and activation method 2.

According to activation method 2, the eNB dynamically activates all or some of the semi-persistent CSI-RS resources, which are configured through RRC, through additional MAC CE signaling. Thereafter, the eNB may activate or deactivate reception of the semi-persistent CSI-RSs by the UE through the DCI. Specifically, the eNB activates CSI-RS candidates through the MAC CE as indicated by reference numeral 800. A time of X1 is needed for the activation of the S-CSI-RS candidates to be available after reception of the MAC CE as indicated by reference numeral 810. Thereafter, the eNB activates an S-CSI-RS through the DCI as indicated by reference numeral 820. A time of X1 is needed for the activation of the S-CSI-RS to be available after reception of the DCI as indicated by reference numeral 830. Thereafter, the eNB may transmit the activated CSI-RSs to the UE as indicated by reference numerals 840 and 850, and the UE may measure and report channel state information on the basis of thereof. Next, the eNB deactivates the S-CSI-RSs through the DCI as indicated by reference numeral 860. A time of Y1 is needed to deactivate the S-CSI-RSs after reception of the DCI as indicated by reference numeral 870. Thereafter, deactivation of the CSI-RS candidates is performed by the MAC CE as indicated by reference numeral 880, and a time of Y1 is needed to deactivate the CSI-RS candidates after reception of the MAC CE. At this time, the durations of time in steps 810 and 830 may be different and the durations of time in steps 870 and 890 may be different.

In the case of method 2, the number of CSI-RS resources which can be activated through the DCI is relatively small, and thus method 2 has advantages in that complexity of measurement by the UE is smaller and dynamic semi-persistent CSI-RS transmission is possible in comparison with activation method 1.

Figure 9:
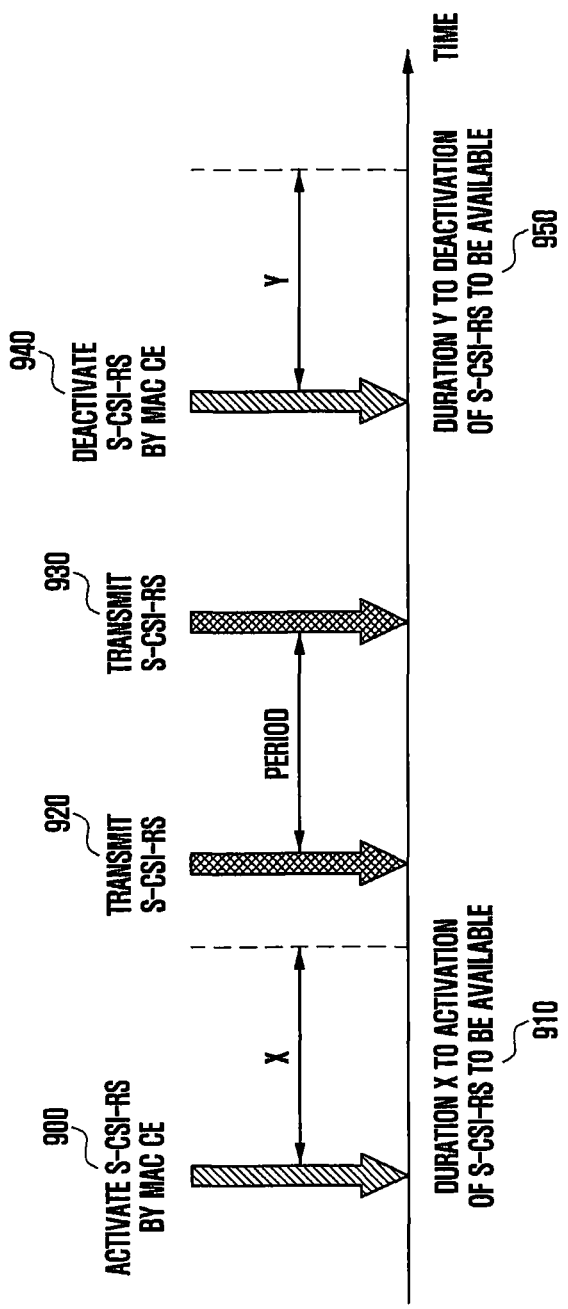
FIG. 9 illustrates an example of the operation of semi-persistent CSI-RS configuration and activation method 3.

FIG. 9 illustrates an example of the operation of semi-persistent CSI-RS configuration and activation method 3.

In activation method 3, the eNB configures a plurality of resources through RRC and activates all or some of the resources through the MAC CE. Specifically, the eNB activates S-CSI-RSs through the MAC CE as indicated by reference numeral 900. A time of X is needed to activate the S-CSI-RSs after reception of the MAC CE as indicated by reference numeral 910. Thereafter, the eNB transmits the S-CSI-RSs to the UE as indicated by reference numeral 920 and 930. Next, the eNB activates S-CSI-RSs through the MAC CE as indicated by reference numeral 940. A time of Y is needed to deactivate the S-CSI-RSs after reception of the MAC CE as indicated by reference numeral 950.

According to method 3, the MAC CE enables reliable transmission through acknowledgement by transmission of ACK/NACK by the UE and thus has an advantage in that the UE never miscalculates activation or deactivation of the CSI-RS resources by the eNB. However, the MAC CE signal itself requires a longer delay time for activation/deactivation in comparison with the DCI and has a disadvantage in flexible and dynamic activation and deactivation.

As described above, NR supports the aperiodic CSI-RS in addition to the semi-persistent CSI RS. The aperiodic CSI-RS is always triggered through the DCI. However, as some resources are activated and deactivated as candidate resources through the MAC CE as described in semi-persistent CSI-RS activation method 2 described above, a method of reducing DCI overhead may be additionally considered.

The periodic CSI-RS resources, the semi-persistent CSI-RS resources, and the aperiodic CSI-RS resources may coexist in one system. At this time, in order to distinguish the periodic CSI-RS resources, the semi-persistent CSI-RS resources, and the aperiodic CSI-RS resources, a CSI-RS transmission type may be directly configured in an RRC resource configuration through RRC.

A method of indicating QCL information and beam-related information to the UE through the DCI or the MAC CE according to the periodic, semi-persistent, and aperiodic CSI-RS transmission may be considered. While a PDSCH-RE-mapping Quasi co-location information (PQI) field is indicated only for PDSCH transmission in LTE, QCL information may be indicated to both the PDCCH and the PDSCH in consideration of control information transmission using a plurality of TRPs and different beams in NR. For example, PDCCH QCL information may be indicated through the MAC CE, and PDSCH information may be indicated through the DCI. In transmission mode (TM) 10 of LTE, the eNB indicates the information to the UE through the PQI field.

Figure 10:
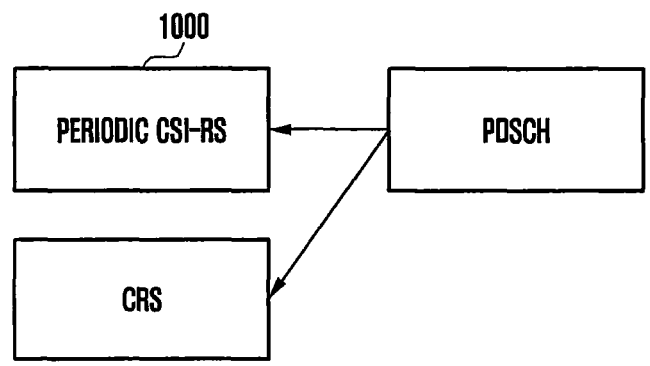
FIGS. 10 and 11 illustrate QCL indication methods in LTE release 11 and release 14.
Figure 11:
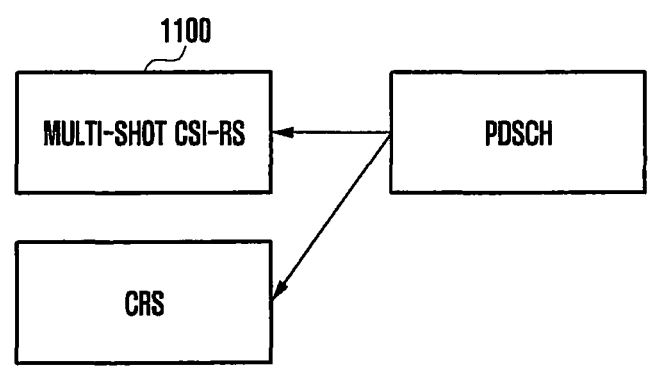

FIGS. 10 and 11 illustrate QCL indication methods in LTE release 11 and release 14. [Table 4] below shows a corresponding PQI information configuration field.

TABLE 4

```
PDSCH-RE-MappingQCL-Config-r11 ::=      SEQUENCE {
    pdsch-RE-MappingQCL-ConfigId-r11        PDSCH-RE-MappingQCL-ConfigId-r11,
    optionalSetOfFields-r11                 SEQUENCE {
        crs-PortsCount-r11                      ENUMERATED {n1, n2, n4, spare1},
        crs-FreqShift-r11                       INTEGER (0..5),
        mbsfn-SubframeConfigList-r11            CHOICE {
            release                                 NULL,
            setup                                   SEQUENCE {
                subframeConfigList                      MBSFN-SubframeConfigList
            }
        }                                                                       OPTIONAL, --
Need ON
        pdsch-Start-r11                         ENUMERATED {reserved, n1, n2, n3,
n4, assigned}
    }                                                                       OPTIONAL, --
Need OP
    csi-RS-ConfigZPId-r11                   CSI-RS-ConfigZPId-r11,
    qcl-CSI-RS-ConfigNZPId-r11              CSI-RS-ConfigNZPId-r11
    OPTIONAL, -- Need OR
    ...
}
```

The eNB transfers a PDSCH transmission start time point of the corresponding transmission, ZP CSI-RS information, and QCLed NAP CSI-RS information together to the UE through the PQI field. Quasi co-location (QCL) includes type A and type B. Type A assumes that a CRS, a CSI-RS, and a DM-RS are QCLed for all pieces of information (delay spread, Doppler spread, Doppler shift, and average delay) and type B assumes that a CRS may support only Doppler spread and Doppler shift information and the UE should acquire other information through a CSI-RS.

Only a periodic CSI-RS 1000 may be supported to indicate QCL information in release 11 as illustrated in FIG. 10, and the eNB may configure a multi-shot CSI-RS 1100 and indicate QCL information in release 14 as illustrated in FIG. 11. Unlike LTE and LTE-A, NR requires indication and transmission of a large number of CSI-RS resources in order to support a large number of beams, and accordingly the semi-persistent CSI-RS and aperiodic CSI-RS-based QCL may be supported differently from LTE-A.

In supporting of QCL in NR, the eNB may configure a plurality of CSI-RSs in the UE. The plurality of CSI-RSs may be supported to indicate a plurality of beams, which the eNB transmits to the UE, and to detect reception beams of the UE corresponding to the plurality of beams transmitted by the eNB. After detecting in advance the reception beams for corresponding data on the basis of information received through the corresponding CSI-RS, the UE may receive data through the reception beams detected by the corresponding CSI-RS in later data reception.

Further, a plurality of CSI-RSs may be configured to estimate different channel parameters depending on CSI-RS characteristics. For example, CSI-RSs transmitted in the entire band and periodic or semi-persistent CSI-RSs may have different QCL supporting for CoMP transmission according to characteristics thereof. The CSI-RSs transmitted in the entire band is very useful to estimate delay information (delay spread and average delay), but may not be suitable for estimating Doppler information (Doppler spread and Doppler shift) in consideration of overhead because a number of transmissions in time resources of the corresponding transmission may not be sufficient. Accordingly, the CSI-RSs in the entire band may be used to estimate only the delay information. On the other hand, the transmitted periodic or semi-persistent CSI-RSs or aperiodic CSI-RSs including repetition may be suitable for estimating Doppler information but may not be suitable for estimating delay information in consideration of a short transmission period. Accordingly, the transmitted periodic or semi-persistent CSI-RSs or the aperiodic CSI-RSs including repetition may be used only for estimating Doppler information.

In order to estimate the DMRS, the UE needs both the delay information and the Doppler information. In LTE, the eNB provides CRS and CSI-RS information to the UE, and the corresponding CRS and CSI-RS is transmitted all the time in the entire band at a short period and thus it is easy to acquire the delay information and the Doppler information through the corresponding information alone. However, in NR, there is no CRS and the CSI-RS includes two types as described above. Accordingly, the UE may receive a configuration of CSI-RS resources that satisfy the condition instead of the CRS in PQI information conventionally providing the CRS and CSI-RS information and thus estimate the delay information and the Doppler information.

If the beam is indicated or the UE performs delay information estimation, Doppler information estimation, or all pieces of information according to the method, it is possible to reduce DCI overhead for QCL indication and efficiently indicate QCL information by supporting a plurality of semi-persistent CSI-RS configurations for one piece of information and using only semi-persistent CSI-RS resources activated using the aforementioned activation methods for the QCL indication.

Figure 12:
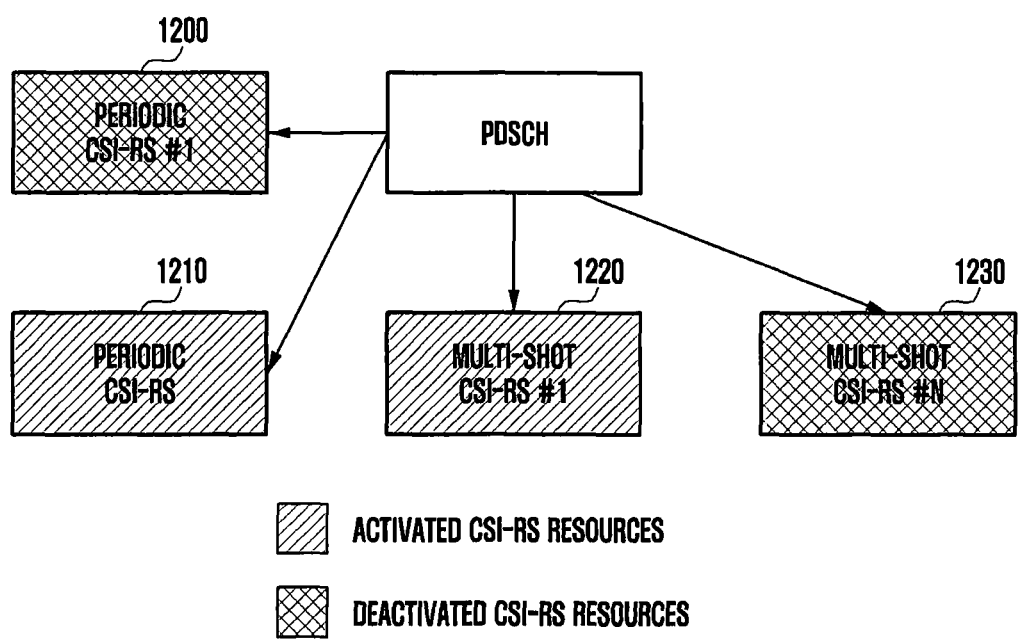
FIG. 12 illustrates an example of the UE operation based on semi-persistent CSI-RSs proposed by the disclosure.

FIG. 12 illustrates an example of the UE operation based on semi-persistent CSI-RSs proposed by the disclosure.

In FIG. 12, the eNB may configure a plurality of periodic and semi-persistent CSI-RS resources for one or a plurality of channel states (Doppler, delay, and angle of arrival (AOA)) and beam-related information in the UE. The UE uses periodic CSI-RSs 1200 and 1210 configured by the eNB through RRC to estimate corresponding information. Further, the UE estimates the corresponding information only through an activated CSI-RS 1220 among the configured semi-persistent CSI-RS resources and does not estimate the corresponding information through a deactivated CSI-RS 1230. At this time, if a plurality of CSI-RS resources satisfy a condition, the UE may estimate channels or beam-related information through all the corresponding aperiodic CSI-RSs or put priority on the corresponding aperiodic CSI-RSs and use the aperiodic CSI-RSs.

In addition to the periodic and semi-persistent CSI-RSs, aperiodic CSI-RSs may be used for QCL-related indication information. For example, aperiodic CSI-RSs transmitted in the entire band or an entirety of a bandwidth part may be used to estimate a delay-related parameter, and the beam-related information may be sufficiently estimated through the aperiodic CSI-RSs alone. Accordingly, the aperiodic CSI-RSs may be used to support the QCL.

Figure 13:
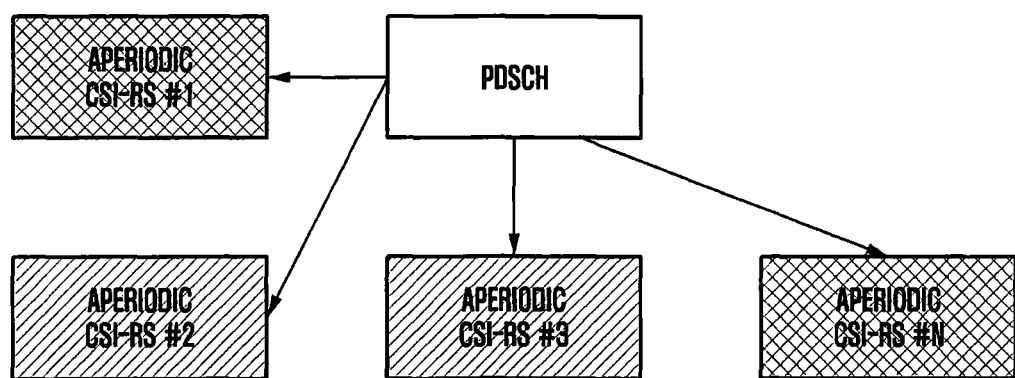
FIG. 13 illustrates an example of the UE operation based on aperiodic CSI-RSs proposed by the disclosure.

FIG. 13 illustrates an example of the UE operation based on aperiodic CSI-RSs proposed by the disclosure.

Like the aforementioned QCL indication based on the semi-persistent CSI-RSs, the eNB may configure a plurality of aperiodic CSI-RS resources for one or a plurality of channel statuses (Doppler, delay, and angle of arrival (AoA)) and beam-related information in the UE in FIG. 13. The UE estimates corresponding information only through aperiodic CSI-RSs which satisfy a specific condition among the aperiodic CSI-RSs configured by the eNB and does not estimate the information through aperiodic CSI-RSs which do not satisfy the condition. At this time, if a plurality of CSI-RS resources satisfy the condition, the UE may estimate channels or beam-related information through all the corresponding aperiodic CSI-RSs or put priority on the corresponding aperiodic CSI-RSs and use the aperiodic CSI-RSs.

FIGS. 12 and 13 illustrate an example in which periodic CSI-RSs and semi-persistent CSI-RSs are configured and an example in which aperiodic CSI-RSs are configured but is not limited thereto, and at least one of the three CSI-RSs may be configured in one piece of QCL indication information according to the The condition for using the aperiodic CSI-RSs is described below.

Aperiodic CSI-RS use condition 1: the UE uses most recently transmitted aperiodic CSI-RS resources.

Aperiodic CSI-RS use condition 2: the UE uses aperiodic CSI-RS resources transmitted within a specific time.

Aperiodic CSI-RS use condition 1 is a method by which the UE identifies CSI-RS resources among aperiodic CSI-RS resources which the eNB configures in the UE and uses the same. This is because the eNB transmitted beams used for transmitting data to the UE in order to acquire recent beam-related information and channel state information. At this time, the number of supported aperiodic CSII-RS resources may be defined in advance in standards. For example, the standards may specify that the UE uses one or two aperiodic CSI-RS resources most recently transmitted. In another method, the eNB configures the number of aperiodic CSI-RS resources used for QCL through the MAC CE or RRC signaling. The method enables aperiodic CSI-RS resources to be more flexible used in the QCL. For example, the eNB may flexibly configure or change the number of beams used for transmitting data to the UE.

Figure 14:
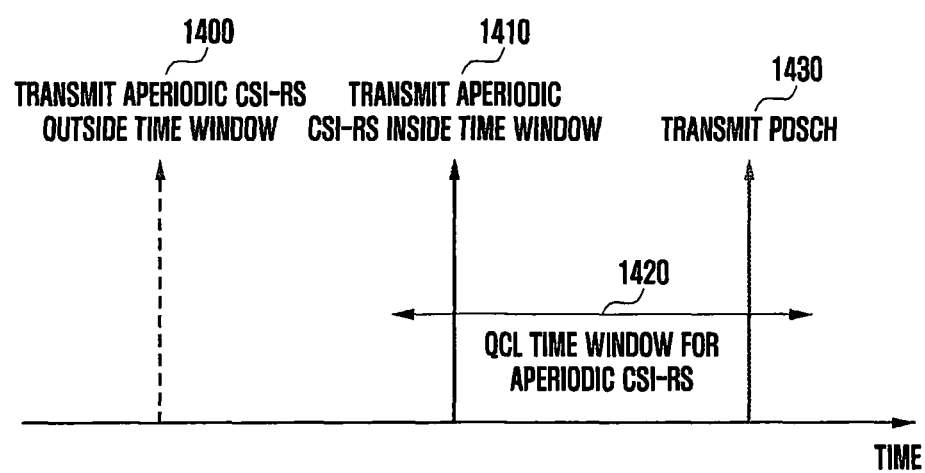
FIG. 14 illustrates an example of aperiodic CSI-RS use condition 2.

Aperiodic CSI-RS use condition 2 is a method using aperiodic CSI-RS resources transmitted within a specific time. FIG. 14 illustrates an example of aperiodic CSI-RS use condition 2.

In FIG. 14, the UE uses only an aperiodic CSI-RS 1410 transmitted within a specific time 1420 from data transmission 1430 to acquire channel state information and beam information for QCL indication and data estimation. An aperiodic CSI-RS 1400 which is not transmitted within the specific time is not used. At this time, time information may be specified in standards (for example, 5 ms or 5 slots) or flexibly used through the MAC CE or RRC as in use condition 1 above. Although the description is made based on a PDSCH transmission time point in FIG. 14, the same may be applied to a PDCCH.

The priority for configuring and using the semi-persistent CSI-RSs and the aperiodic CSI-RSs for QCL indication may be indicated by the following methods.

Priority 1 in the case in which a plurality of CSI-RSs are indicated: the UE estimates channel beam-related information preferentially using semi-persistent CSI-RSs.

Priority 2 in the case in which a plurality of CSI-RSs are indicated: the UE estimates channel and beam-related information preferentially using aperiodic CSI-RSs.

Priority 3 in the case in which a plurality of CSI-RSs are indicated: the UE estimates channel and beam-related information preferentially using periodic CSI-RSs.

Priority 4 in the case in which a plurality of CSI-RSs are indicated: the UE estimates channel beam-related information according to CSI-RS IDs.

Priority 5 in the case in which a plurality of CSI-RSs are indicated: the UE estimates channel beam-related information according to RRC configuration.

Priority supporting method 1 in the case in which a plurality of CSI-RSs are indicated is a method in which the semi-persistent CSI-RS has a high priority. For example, if the semi-persistent CSI-RS and the periodic CSI-RS or the aperiodic CSI-RS are simultaneously indicated, the UE may estimate that the eNB has activated the activated semi-persistent CSI-RS for QCL indication and may use the corresponding CSI-RS. If the semi-persistent CSI-RS is activated, the semi-persistent CSI-RS is periodically transmitted, and thus may have a higher accuracy compared to the aperiodic CSI-RS, and flexible beam switching may be supported using dynamic and flexible activation and deactivation of the semi-persistent CSI-RS.

Priority supporting method 2 in the case in which a plurality of CSI-RSs are indicated is a method in which the aperiodic CSI-RS has a high priority. For example, if the semi-persistent CSI-RS and the periodic CSI-RS or the aperiodic CSI-RS are simultaneously indicated, the UE may estimate that the eNB has activated the triggered aperiodic CSI-RS for QCL indication and may use the corresponding CSI-RS. The aperiodic CSI-RS is transmitted only once and thus may reduce overheard and is easier to use a DCI-based trigger compared to the periodically transmitted semi-persistent CSI-RS. Accordingly, the QCL indication may be performed using the aperiodic CSI-RS.

Priority supporting method 3 in the case in which a plurality of CSI-RSs are indicated is a method in which the periodic CSI-RS has a high priority. For example, if the semi-persistent CSI-RS and the periodic CSI-RS or the aperiodic CSI-RS are simultaneously indicated, the UE may estimate that the eNB has used the activated periodic CSI-RS for QCL indication and may use the corresponding CSI-RS. The periodic CSI-RS is configured through a higher layer and can be changed only through RRC reconfiguration, and thus the method may be used for stable beam information indication.

Priority supporting method 4 in the case in which a plurality of CSI-RSs are indicated is a method in which CSI-RSs have a high priority according to CSI-RS IDs. The BS may indirectly configure priorities of CSI-RS resources through CSI-RS IDs. Accordingly, the eNB may control the priorities of the CSI-RS resources without a direct priority configuration field.

Priority supporting method 5 in the case in which a plurality of CSI-RSs are indicated is a method in which the priority is configured according to RRC configuration. The eNB may configure the priority in the UE and indicate the same according to a condition with a field indicating the priority of the CSI-RS through RRC. For example, if the semi-persistent CSI-RS is activated, the eNB may configure whether the semi-persistent CSI-RS has a higher priority than the periodic CSI-RS in QCL. Such a configuration may be applied to all pieces of QCL-related indication information supported by the UE through one field, or each field may be provided for each piece of QCL-related indication information.

The priority may be applied differently according to a channel and a beam parameter. For example, in the case of the beam-related parameter, the aperiodic CSI-RS may be first used through priority 2. In the case of the delay-related parameter, the semi-persistent CSI-RS may be first used through priority 1.

Figure 15:
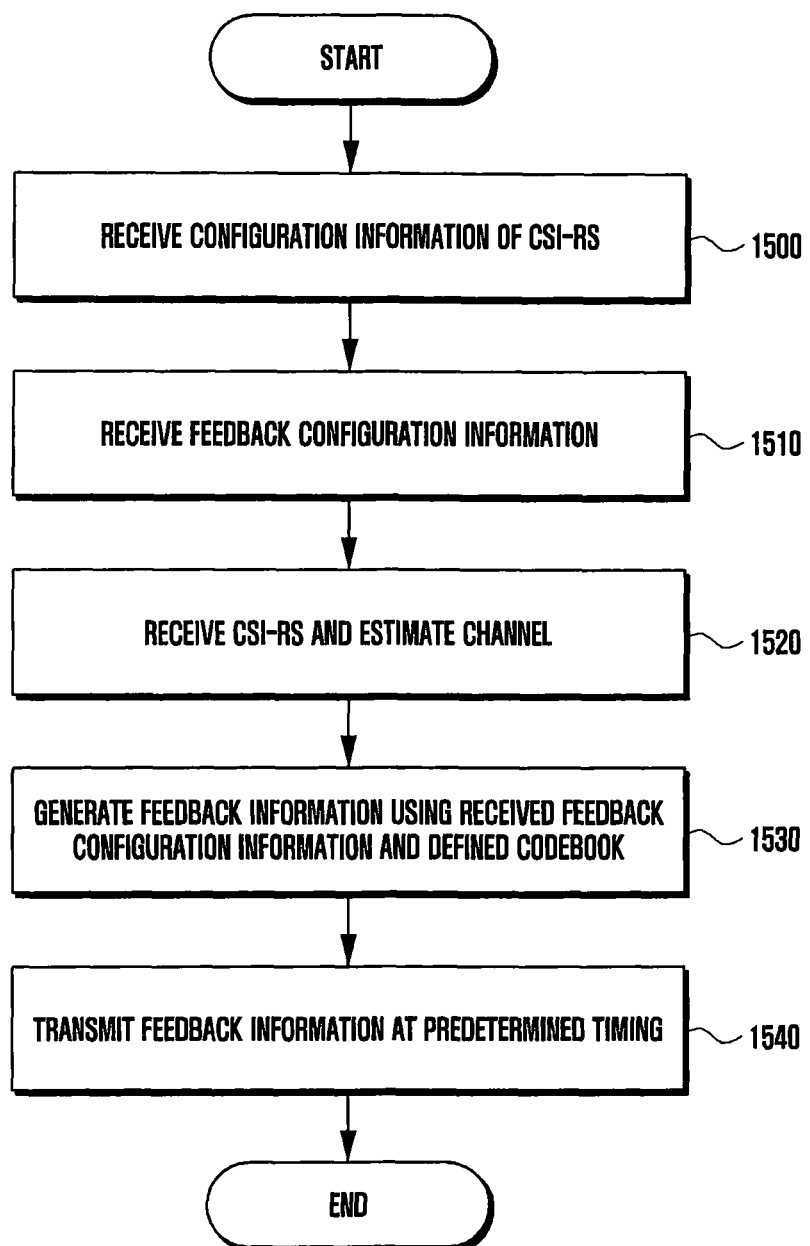
FIG. 15 is a flowchart illustrating the UE operation according to an embodiment of the disclosure.

FIG. 15 is a flowchart illustrating the operation order of the UE according to an embodiment of the disclosure.

Referring to FIG. 15, the UE receives configuration information associated with an aperiodic CSI-RS configuration in step 1500. The UE may identify at least one of the number of ports for each aperiodic CSI-RS, N1 and N2 which are numbers of antennas for respective dimensions, O1 and O2 which are oversampling factors for respective dimensions, one subframe configuration for transmitting a plurality of CSI-RSs, a plurality of resource configurations for configuring a position, codebook subset limit-related information, CSI report-related information, a CSI process index, and transmission power information on the basis of the received configuration information. Thereafter, the UE configures one piece of feedback configuration information based on one or more CSI-RSs in step 1510. In the corresponding information, PMI and/or CQI period and offset, RI period and offset, wideband or subband, and submode may be configured. The UE receives a plurality of CSI-RSs within one subframe on the basis of the corresponding information and estimates a channel between an antenna of the eNB and a reception antenna of the UE on the basis thereof in step 1520. The UE generates RI, PMI, and CQI that are feedback information through a feedback configuration received on the basis of the estimated channel and a virtual channel added between CSI-RSs in step 1530. In operation 1540, the UE transmits the feedback information at a feedback timing defined in the feedback configuration to the eNB and completes the channel feedback generation and report process that takes into consideration a 2D array.

Figure 16:
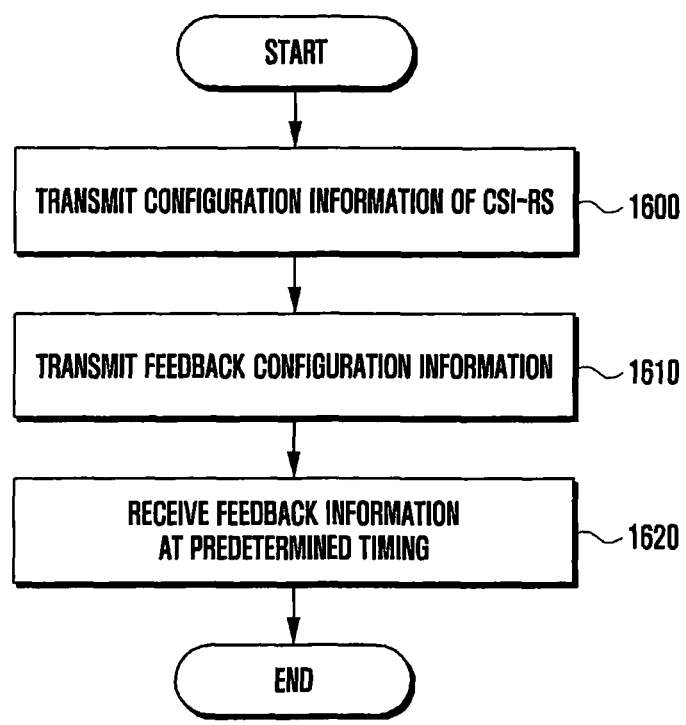
FIG. 16 is a flowchart illustrating the eNB operation according to an embodiment of the disclosure.

FIG. 16 is a flowchart illustrating the operation order of the eNB according to an embodiment of the disclosure.

Referring to FIG. 16, in step 1600, the eNB transmits configuration information associated with a CSI-RS for measuring a channel to the UE. The configuration information may include at least one of the number of ports for each aperiodic CSI-RS, N1 and N2 which are numbers of antennas for respective dimensions, O1 and O2 which are oversampling factors for respective dimensions, one subframe configuration for transmitting a plurality of CSI-RSs, a plurality of resource configurations for configuring a position, codebook subset limit-related information, CSI report-related information, a CSI process index, and transmission power information. Subsequently, the eNB transmits feedback configuration information based on at least one CSI-RS to the UE in step 1610. In the corresponding information, PMI and/or CQI period and offset, RI period and offset, wideband or narrowband, and submode may be configured. Subsequently, the eNB transmits a configured CSI-RS to the UE. The UE estimates a channel for each antenna port and estimates an additional channel for virtual resources on the basis thereof. The UE determines a feedback, generates PMI, RI, and CQI corresponding thereto, and transmits the same to the eNB. Therefore, the eNB receives feedback information from the UE at a determined timing and uses the same for determining a channel state between the UE and the eNB in step 10620.

Figure 17:
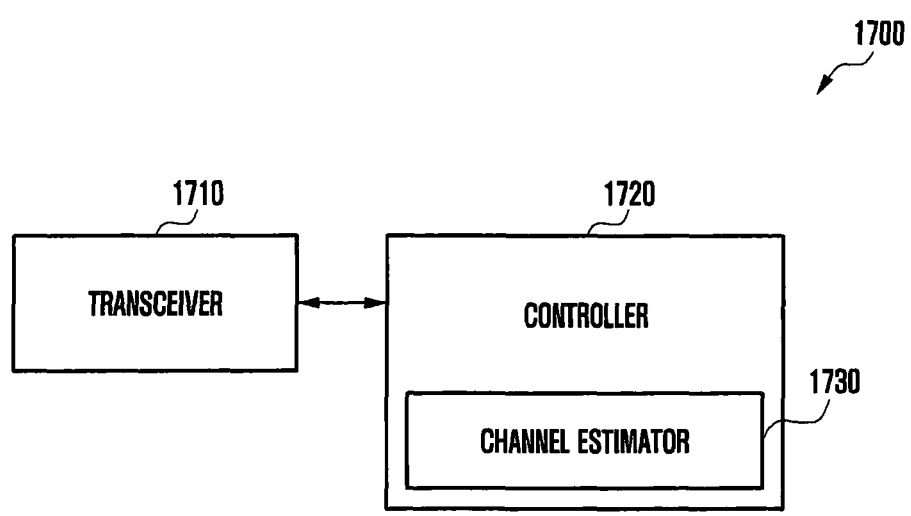
FIG. 17 is a block diagram illustrating an internal structure of the UE according to an embodiment of the disclosure.

FIG. 17 is a block diagram illustrating an internal structure of the UE according to an embodiment of the disclosure.

Referring to FIG. 17, a UE 1700 includes a transceiver 1710 and a controller 1720. The transceiver 1710 performs a function of transmitting or receiving data to or from the outside (for example, an eNB). The transceiver 1710 may transmit feedback information to the eNB under the control of the controller 1720. The controller 1720 controls statuses and operations of all elements included in the UE. Specifically, the controller 1720 generates feedback information on the basis of information received from the eNB. Further, the controller 1720 controls the transceiver 1710 to feed back the generated channel information to the eNB according to timing information received from the eNB.

To this end, the controller 1720 may include a channel estimator 1730. The channel estimator 1730 determines required feedback information through a CSI-RS and feedback allocation information received from the eNB and estimates a channel using the received CSI-RS on the basis of the feedback information. Further, the PDSCH is decoded on the basis of DCI transmitted by the eNB through the application of the size and rank of the PRG corresponding to the corresponding PDSCH transmission and reference signal mapping in which a precoder is applied to DMRS ports described in an embodiment of the disclosure.

Although FIG. 17 has described the example in which the UE includes the transceiver 1710 and the controller 1720, the disclosure is not limited thereto and may further include various elements according to a function executed in the UE. For example, the UE may further include a display unit for displaying the present status of the UE, an input unit for inputting a signal of executing a function by the user, and a storage unit for storing generated data in the UE. Also, it is illustrated that the channel estimator 1730 is included in the controller 1720, but this may not be limited thereto.

The controller 1720 may control the transceiver 1710 to receive configuration information associated with each of one or more reference signal resources from the eNB. The controller 2720 may measure the one or more reference signals and control the transceiver 1710 to receive feedback configuration information for generating feedback information according to the measurement result from the eNB.

The controller 1720 may measure one or more reference signals received through the transceiver 1710 and generate feedback information according to the feedback configuration information. The controller 1720 may control the transceiver 1710 to transmit the generated feedback information to the eNB at a feedback timing defined in the feedback configuration information. The controller 1720 may receive a CSI-RS from the eNB, generate feedback information based on the received CSI-RS, and transmit the generated feedback information to the eNB. In this instance, the controller 1720 may select a precoding matrix for each antenna port group of the eNB and further select one additional precoding matrix on the basis of the relationship between the antenna port groups of the eNB.

The controller 1720 may receive a CSI-RS from the eNB, generate feedback information based on the received CSI-RS, and transmit the generated feedback information to the eNB. At this time, the controller 1720 may select one precoding matrix for all antenna port groups of the eNB. The controller 1720 may receive feedback configuration information from the eNB, receive a CSI-RS from the eNB, generate feedback information on the basis of the received feedback configuration information and the received CSI-RS, and transmit the generated feedback information to the eNB. In this instance, the controller 1720 may receive feedback configuration information corresponding to each antenna port group of the eNB and additional feedback configuration information based on the relationship between antenna port groups.

Figure 18:
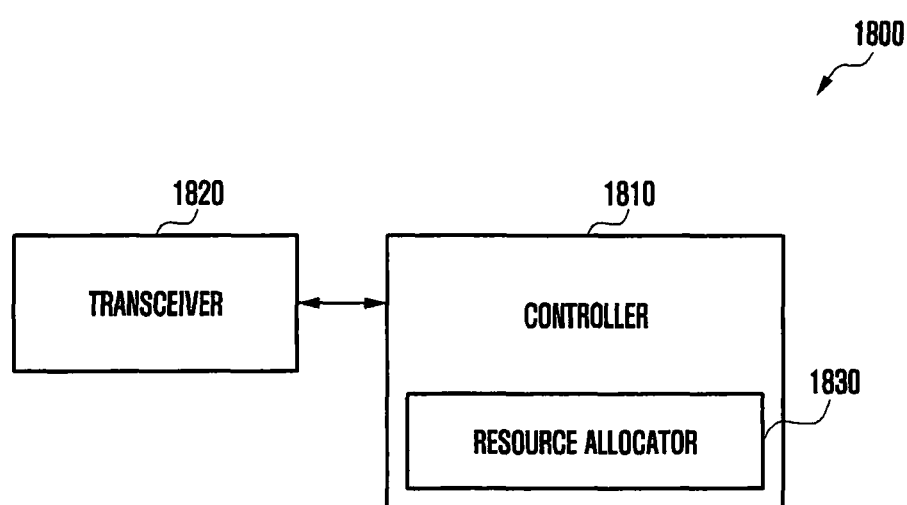
FIG. 18 is a block diagram illustrating an internal structure of the eNB according to an embodiment of the disclosure.

FIG. 18 is a block diagram illustrating the internal structure of the eNB according to an embodiment of the disclosure.

Referring to FIG. 18, an eNB 1800 includes a controller 1810 and a transceiver 1820. The controller 1810 controls statuses and operations of all elements included in the eNB. Specifically, the controller 1810 may allocate CSI-RS resources for channel estimation to the UE and allocate feedback resources and a feedback timing to the UE. To this end, the controller 1810 may further include a resource allocator 1830. The controller 1810 may allocate a feedback configuration and a feedback timing to prevent a collision between feedbacks from a plurality of UEs, receive configured feedback information at the corresponding timing, and interpret the same. The transceiver 1820 performs a function of transmitting and receiving a reference signal and feedback information to and from the UE. The transceiver 1820 transmits aperiodic CSI-RSs to the UE through the allocated resources and receives a feedback for channel information from the UE under the control of the controller 1810. Although it is illustrated that the resource allocator 1830 is included in the controller 1810, this is not limited thereto.

The controller 1810 may control the transceiver 1820 to transmit configuration information associated with each of one or more reference signals to the UE or generate the one or more reference signals. The controller 1810 may control the transceiver 1820 to transmit feedback configuration information for generating feedback information according to the measurement result to the UE. The controller 1810 may control the transceiver 1820 to transmit the one or more reference signals to the UE and to receive feedback information transmitted from the UE at the feedback timing set in the feedback configuration information. The controller 1810 may transmit the feedback configuration information to the UE, transmit a CSI-RS to the UE, and receive feedback information generated on the basis of the feedback configuration information and the CSI-RS from the UE. In this instance, the controller 1810 may transmit feedback configuration information corresponding to each antenna port group of the eNB and additional feedback configuration information based on the relationship between antenna port groups. Further, the controller 1810 may transmit beamformed CSI-RSs based on the feedback information to the UE and receive the feedback information generated on the basis of the CSI-RSs from the UE.

The invention claimed is:

1. A method performed by a terminal in a wireless communication system, the method comprising:
    receiving, from a base station, a radio resource control (RRC) message including a plurality of configurations associated with a channel state information (CSI) report, wherein each configuration associated with the CSI report includes aperiodic channel state information-reference signal (CSI-RS) resource information, and the aperiodic CSI-RS resource information is associated with quasi co-location (QCL) information;
    receiving, from the base station, a medium access control-control element (MAC-CE) message, wherein a sub selection among the plurality of configurations associated with the CSI report configured by the RRC message is indicated by MAC-CE message;
    receiving, from the base station, downlink control information (DCI), wherein a configuration associated with the CSI report among the sub selection indicated by the MAC-CE message is indicated by the DCI;
    performing a measurement based on an aperiodic CSI-RS resource included in the configuration associated with the CSI report; and
    transmitting, to the base station, the CSI report based on the measurement.

2. The method of claim 1, further comprising:
    receiving, from the base station, a first DCI including information associated with an aperiodic CSI-RS resource, wherein the aperiodic CSI-RS resource is QCLed with a demodulation reference signal (DMRS) port of a physical downlink shared channel (PDSCH); and
    receiving, from the base station, the PDSCH based on the first DCI.

3. The method of claim 1,
    wherein a time duration between the DCI and an aperiodic CSI-RS received based on the configuration associated with the CSI report exceeds a threshold.

4. The method of claim 1, wherein the RRC message further includes CSI report configuration information associated with codebook subset restriction information.

5. The method of claim 1,
    wherein the QCL information includes QCL type information,
    wherein, in case that the QCL type information is a type A, a QCL assumption is for a doppler shift, a doppler spread, an average delay, and a delay spread, and
    wherein, in case that the QCL type information is a type B, the QCL assumption is only for the doppler shift and the doppler spread.

6. The method of claim 1,
    wherein a resource type of a CSI-RS resource is configured to aperiodic based on the RRC message.

7. A method performed by a base station in a wireless communication system, the method comprising:
    transmitting, to a terminal, a radio resource control (RRC) message including a plurality of configurations associated with a channel state information (CSI) report, wherein each configuration associated with the CSI report includes aperiodic channel state information-reference signal (CSI-RS) resource information, and the aperiodic CSI-RS resource information is associated with quasi co-location (QCL) information;
    transmitting, to the terminal, a medium access control control element (MAC-CE) message, wherein a sub selection among the plurality of configurations associated with the CSI report configured by the RRC message is indicated by MAC-CE message;
    transmitting, to the terminal, downlink control information (DCI), wherein a configuration associated with the CSI report among the sub selection indicated by the MAC-CE message is indicated by the DCI; and
    receiving, from the terminal, the CSI report based a measurement,
    wherein the measurement is performed based on an aperiodic CSI-RS resource included in the configuration associated with the CSI report.

8. The method of claim 7, further comprising:
    transmitting, to a terminal, a first DCI including information associated with an aperiodic CSI-RS resource, wherein the aperiodic CSI-RS resource is QCLed with a demodulation reference signal (DMRS) port of a physical downlink shared channel (PDSCH); and
    transmitting, to the terminal, the PDSCH based on the first DCI.

9. The method of claim 7,
wherein the QCL information includes QCL type information,
wherein, in case that the QCL type information is a type A, a QCL assumption is for a doppler shift, a doppler spread, an average delay, and a delay spread,
wherein, in case that the QCL type information is a type B, the QCL assumption is only for the doppler shift and the doppler spread, and
wherein a time duration between the DCI and an aperiodic CSI-RS received based on the configuration associated with the CSI report exceeds a threshold.

10. The method of claim 7, wherein the RRC message further includes CSI report configuration information associated with codebook subset restriction information.

11. A terminal in a wireless communication system, the terminal comprising:
a transceiver; and
a processor, wherein the processor is configured to:
receive, from a base station, a radio resource control (RRC) message including a plurality of configurations associated with a channel state information (CSI) report, wherein each configuration associated with the CSI report includes aperiodic channel state information-reference signal (CSI-RS) resource information, and the aperiodic CSI-RS resource information is associated with quasi-co location (QCL) information,
receive, from the base station, a medium access control-control element (MAC-CE) message, wherein a sub selection among the plurality of configurations associated with the CSI report configured by the RRC message is indicated by MAC-CE message,
receiving, from the base station, downlink control information (DCI), wherein a configuration associated with the CSI report among the sub selection indicated by the MAC-CE message is indicated by the DCI,
perform a measurement based on an aperiodic CSI-RS resource included in the configuration associated with the CSI report, and
transmit, to the base station, the CSI report based on the measurement.

12. The terminal of claim 11, wherein the processor is further configured to:
receive, from the base station, a first DCI including information associated with an aperiodic CSI-RS resource, wherein the aperiodic CSI-RS resource is QCLed with a demodulation reference signal (DMRS) port of a physical downlink shared channel (PDSCH), and
receive, from the base station, the PDSCH based on the first DCI.

13. The terminal of claim 11, wherein the QCL configuration includes QCL type information,
wherein, in case that the QCL type information is a type A, a QCL assumption is for a doppler shift, a doppler spread, an average delay, and a delay spread,
wherein, in case that the QCL type information is a type B, the QCL assumption is only for the doppler shift and the doppler spread, and
wherein a time duration between the DCI and an aperiodic CSI-RS received based on the configuration associated with the CSI report exceeds a threshold.

14. The terminal of claim 11, wherein a time duration between the DCI and an aperiodic CSI-RS received based on the configuration associated with the CSI report exceeds a threshold.

15. A base station in a wireless communication system, the base station comprising:
a transceiver; and
a processor, wherein the processor is configured to:
transmit, to a terminal, a radio resource control (RRC) message including a plurality of configurations associated with a channel state information (CSI) report, wherein each configuration associated with the CSI report includes aperiodic channel state information-reference signal (CSI-RS) resource information, and the aperiodic CSI-RS resource information is associated with quasi-co location (QCL) information,
transmit, to the terminal, a medium access control control element (MAC CE) message, wherein a sub selection among the plurality of configurations associated with the CSI report configured by the RRC message is indicated by MAC-CE message,
transmit, to the terminal, downlink control information (DCI), wherein a configuration associated with the CSI report among the sub selection indicated by the MAC-CE message is indicated by the DCI, and
receive, from the terminal, the CSI report based on a measurement,
wherein the measurement is performed based on an aperiodic CSI-RS resource included in the configuration associated with the CSI report.

16. The base station of claim 15,
wherein the QCL information includes QCL type information,
wherein, in case that the QCL type information is a type A, a QCL assumption is for a doppler shift, a doppler spread, an average delay, and a delay spread,
wherein, in case that the QCL type information is a type B, the QCL assumption is only for the doppler shift and the doppler spread, and
wherein a time duration between the DCI and an aperiodic CSI-RS received based on the configuration associated with the CSI report exceeds a threshold.

17. The base station of claim 15,
wherein the RRC message further includes CSI report configuration information associated with codebook subset restriction information.

* * * * *